(12) United States Patent
Nakano et al.

(10) Patent No.: US 9,499,021 B2
(45) Date of Patent: Nov. 22, 2016

(54) ELASTIC SHEET AND SUSPENSION APPARATUS

(71) Applicant: SHOWA CORPORATION, Gyoda-shi (JP)

(72) Inventors: Gota Nakano, Gyoda (JP); Kazuki Hirawata, Gyoda (JP);
(Continued)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/090,066

(22) Filed: Nov. 26, 2013

(65) Prior Publication Data
US 2014/0265081 A1    Sep. 18, 2014

(30) Foreign Application Priority Data

Mar. 12, 2013  (JP) ................................. 2013-048920
Sep. 20, 2013  (JP) ................................. 2013-194998

(51) Int. Cl.
*B60G 11/22*    (2006.01)
*B60G 15/06*    (2006.01)
(Continued)

(52) U.S. Cl.
CPC .............. *B60G 11/22* (2013.01); *B60G 11/16* (2013.01); *B60G 15/06* (2013.01); *F16F 1/122* (2013.01);
(Continued)

(58) Field of Classification Search
CPC ..................... B60G 11/16; B60G 11/22; B60G 15/06; B60G 15/068; B60G 13/003;
(Continued)

(56) References Cited

U.S. PATENT DOCUMENTS 5,263,694 A * 11/1993 Smith .................. B60G 15/068
                                                              267/162
5,421,565 A *  6/1995 Harkrader .............. B60G 11/16
                                                              267/153
(Continued)

FOREIGN PATENT DOCUMENTS

CN    202623837 U    12/2012
JP    57-148508 U     9/1982
(Continued)

OTHER PUBLICATIONS

Office Action mailed May 16, 2014 for the corresponding Japanese Application No. 2013-194998.
(Continued)

*Primary Examiner* — Robert A Siconolfi
*Assistant Examiner* — San Aung
(74) *Attorney, Agent, or Firm* — Leason Ellis LLP

(57) ABSTRACT

An elastic sheet includes: a seating portion by which the coil spring is supported and which has a circular arc shape in a view from the axial direction, one circumferential side of the seating portion being a side of entry of the coil spring; and a pair of sidewall portions extending from respective widthwise opposite ends of the seating portion toward the coil spring side, at least one of the sidewall portions has a wire contact surface that contacts a wire forming the coil spring and an inclined surface inclined so as to approach the spring bearing as the inclined surface extends widthwise outward from the wire contact surface, and a radius of curvature of the wire contact surface at least at a side closest to the inclined surface is smaller than a radius of the wire.

18 Claims, 26 Drawing Sheets

(72) Inventors: Nariaki Sato, Gyoda (JP); Kunio Shibasaki, Gyoda (JP)

(51) Int. Cl.
*B60G 11/16* (2006.01)
*F16F 1/12* (2006.01)

(52) U.S. Cl.
CPC ..... *F16F 1/126* (2013.01); *B60G 2204/12422* (2013.01)

(58) Field of Classification Search
CPC .................. B60G 2202/312; B60G 2204/128; B60G 2204/4502; B60G 2204/12422; B60G 11/52; B60G 15/062; B60G 2202/143; B60G 2202/12; B60G 2204/124; B60G 2206/821; B60G 2206/73; B60G 2206/91; F16F 1/122; F16F 1/126; F16F 156/10
USPC ......................................................... 267/220
See application file for complete search history.

(56) References Cited

U.S. PATENT DOCUMENTS

| | | | | |
|---|---|---|---|---|
| 5,620,171 | A * | 4/1997 | Wakatsuki | B60G 15/063 267/179 |
| 6,273,407 | B1 * | 8/2001 | Germano | B60G 13/005 267/172 |
| 2004/0094879 | A1 * | 5/2004 | Duval | F16F 1/126 267/33 |
| 2006/0131119 | A1 * | 6/2006 | Ishikawa | B60G 15/063 188/321.11 |
| 2012/0234995 | A1 * | 9/2012 | Dietert | B60G 11/14 248/205.1 |

FOREIGN PATENT DOCUMENTS

| | | |
|---|---|---|
| JP | 05-272565 A | 10/1993 |
| JP | 06-280913 A | 10/1994 |
| JP | 2002-021899 A | 1/2002 |
| JP | 2005-273679 A | 10/2005 |
| JP | 2012-219825 A | 11/2012 |
| TW | 2009-04663 A | 2/2009 |

OTHER PUBLICATIONS

European Search Report mailed Jun. 4, 2014 for the corresponding European Application No. 13194572.7.
Office Action mailed Aug. 3, 2015 for the corresponding Chinese Application No. 201310632031.4.
Office Action dated Aug. 29, 2016 for the corresponding Taiwanese Patent Application No. 102143621.

\* cited by examiner

ELASTIC SHEET AND SUSPENSION APPARATUS

CROSS-REFERENCE TO RELATED APPLICATIONS

This application claims the benefit of Japanese Patent Application JP 2013-048920, filed Mar. 12, 2013 and Japanese Patent Application JP 2013-194998, filed Sep. 20, 2013, the entire contents of which are hereby incorporated by reference, the same as if set forth at length.

BACKGROUND OF THE INVENTION

1. Field of the Invention

The present invention relates to an elastic sheet and a suspension apparatus.

2. Description of the Background Art

Japanese Patent Application Laid-open No. 2012-219825 (FIG. 3) describes, as shown in FIG. 21, a conventional technique for a vehicle suspension apparatus 500 in which a rubber sheet 530 is provided between a coil spring 522 extending in an up-down direction and a spring bearing 525 fixed to a hydraulic shock absorber 521 to prevent noise between the coil spring 522 and the spring bearing 525.

However, according to Japanese Patent Application Laid-open No. 2012-219825 (FIG. 3), the coil spring 522 is fitted into a semicircular spring groove 532b formed at an upper surface of the rubber sheet 530. Thus, when the coil spring 522 recovers from a deformed state after compression, a gap may be formed between the coil spring 522 and the spring groove 532b, and mud, sand, or the like may enter the gap. Then, when the coil spring 522 is repeatedly extended and compressed with the mud, sand, or the like in the gap, the rubber sheet 530 may be damaged or the coil spring 522 may have its coating chipped or be broken.

Patent Literature 1: Japanese Patent Application Laid-open No. 2012-219825 (FIG. 3)

SUMMARY OF THE INVENTION

Thus, an object of the present invention is to provide an elastic sheet that can prevent the coil spring from, for example, having its coating chipped or being broken as a result of the entry of mud, sand, or the like, and a suspension apparatus with the elastic sheet.

To achieve this object, an aspect of the present invention provides an elastic sheet interposed between a coil spring that is provided in a suspension apparatus and that extends in an axial direction of the suspension apparatus and a spring bearing that supports the coil spring, this elastic sheet including: a seating portion by which the coil spring is supported and which has a circular arc shape in a view from the axial direction, one circumferential side of the seating portion being a side of entry of the coil spring; and a pair of sidewall portions extending from respective width-wise opposite ends of the seating portion toward the coil spring side, wherein at least one of the sidewall portions has a wire contact surface that contacts a wire forming the coil spring and an inclined surface that is inclined so as to approach the spring bearing as the inclined surface extends widthwise outward from the wire contact surface, and a radius of curvature of the wire contact surface at least at a side closest to the inclined surface is smaller than a radius of the wire.

According to such a configuration, at least one sidewall portion of the pair of sidewall portions extending from the respective width-wise opposite ends of the seating portion toward the coil spring side includes the wire contact surface that contacts the wire forming the coil spring, and the radius of curvature of the wire contact surface at least at a side closest to the inclined surface is smaller than the radius of the wire. Therefore, the at least one sidewall portion tightens the wire. Thus, the sidewall portion and the wire come into tight contact with each other so that a gap is unlikely to be formed between the sidewall portion and the wire and thus mud, sand, or the like is unlikely to flow in between the coil spring and the elastic sheet.

Furthermore, at least one of the sidewall portions includes the inclined surface inclined so as to approach the spring bearing as the inclined surface extends widthwise outward from the wire contact surface. Therefore, mud, sand, or the like attached to the elastic sheet slides down widthwise outward along the inclined surface.

A combination of these effects prevents mud, sand, or the like from flowing in between the sidewall portion and the wire and causes the mud, sand, or the like to slide off from the elastic sheet. As a result, the elastic sheet according to the aspect of the present invention can prevent the coil spring from, for example, having its coating chipped or being broken.

Furthermore, in the elastic sheet, a protruding portion protruding toward the wire is preferably formed on a coil spring entry side of a groove surface of the elastic sheet which contacts the coil spring.

According to such a configuration, the protruding portion formed on the coil spring entry side of the groove surface so as to protrude toward the wire contacts the wire. This further prevents a gap from being formed between the groove surface and the wire on the coil spring entry side, thus allowing the coil spring to be prevented from, for example, having its coating chipped or broken.

Furthermore, the elastic sheet preferably includes a collapsing margin that is formed on the spring bearing side and that, when collapsed, generates a tightening force that tightens one of the sidewall portions against the wire.

According to such a configuration, when the elastic sheet is assembled on the spring bearing, the collapsing margin formed on the spring bearing side of the elastic sheet is collapsed to generate the tightening force that tightens one of the sidewall portions against the wire. This brings the sidewall portion into tight contact with the wire to further prevent a gap from being formed between the sidewall portion and the wire. As a result, the configuration can prevent the coil spring from, for example, having its coating chipped or being broken.

Furthermore, in the elastic sheet, a first recess portion is preferably formed on an end surface of the seating portion at the side of entry of the coil spring.

Such a configuration exerts the following effect. When the coil spring is compressed to apply a compressive load to the elastic sheet, the seating portion is deformed so as to extend in a circumferential direction thereof (because the volume of the collapsed elastic sheet escapes). However, on the coil spring entry side, a part of the deformed seating portion escapes into the first recess portion formed on an end surface of the seating portion at the side of entry of the coil spring. Thus, the entry side end surface (which contacts the coil spring) of the seating portion is prevented from being deformed so as to protrude from an outline of the entry side end surface, thus preventing the inflow of sand, mud, or the like. This also enables the coil spring to be prevented from locally exerting an excessive pressure to the seating portion on the coil spring entry side. As a result, the seating portion and the wire can be prevented from rubbing each other (coming in sliding contact with each other) on the coil spring entry side. Even if, for example, sand, mud, or the like flows in between the seating portion and the wire, the coil spring can be prevented from, for example, having its coating chipped or being broken.

Furthermore, in the elastic sheet, the end surface of the seating portion at the side of entry of the coil spring is preferably oblique in such a manner that the end surface of the seating portion at the side of entry of the coil spring at a side of the spring bearing is recessed.

According to such a configuration, at the entry side end surface (of the elastic sheet), a spring bearing side end (an end at a spring bearing side) is located more inward than a coil spring side end (an end at a coil spring side) in the circumferential direction of the elastic sheet. Therefore, the entry side end surface (of the elastic sheet) collapses around the spring bearing side end to make the position of the coil spring side end of the elastic sheet unlikely to move with respect to the coil spring. In short, a contact portion between the elastic sheet and the coil spring on the entry side end surface of the elastic sheet can be made constant, facilitating prevention of possible rubbing (sliding contact) between the elastic sheet and the coil spring. As a result, even if, for example, sand, mud, or the like flows in between the seating portion and the wire, the coil spring can be prevented from, for example, having its coating chipped or being broken.

Additionally, in the elastic sheet, a second recess portion that is open toward a side of the spring bearing is preferably formed on the seating portion at a side of the spring bearing.

Such a configuration exerts the following effect. For example, when the coil spring is compressed to apply a compressive load to the elastic sheet, a part of the seating portion immediately below the coil spring which is most significantly deformed escapes into the recess portion formed at the opposite spring bearing side surface of the seating portion. Thus, the deformed seating portion avoids coming into contact with the spring bearing, allowing the elastic sheet (particularly the seating portion) to be prevented from being damaged. Furthermore, the seating portion is prevented from extending in a radial direction thereof, allowing the shape of the elastic sheet to be maintained.

Moreover, for example, when the coil spring is compressed to apply a compressive load to the elastic sheet, then in conjunction with the escape of the part of the seating portion into the second recess portion, the sidewall portions are deformed toward the seating portion and come into tight contact with the wire (of the coil spring). This prevents sand, mud, or the like from flowing in between the seating portion and the wire.

A combination of these effects allows the configuration to prevent the elastic sheet (particularly the seating portion) from being damaged, while preventing the coil spring from, for example, having its coating chipped or being broken.

Furthermore, preferably, in the elastic sheet, the second recess portion is formed to prevent an area of the seating portion located immediately below the wire, which forms the coil spring, from coming into contact with the spring bearing when the coil spring is compressed.

According to such a configuration, in addition to when the coil spring is uncompressed to apply no compressive load to the elastic sheet, even when, for example, the coil spring is compressed to apply a compressive load to the elastic sheet, the area located immediately below the wire forming the coil spring is prevented from coming into contact with the spring bearing. This allows the area of the elastic sheet located immediately below the wire forming the coil spring to be restrained from being damaged. Hence, the present configuration can restrain the elastic sheet from being broken.

Additionally, preferably, in the elastic sheet, the second recess portion is formed to have a triangle shape with a vertex corresponding to the area of the seating portion located immediately below the wire, which forms the coil spring.

In such a configuration, when, for example, the coil spring is compressed to apply a compressive load to the elastic sheet, central portions of two sides extending from the vertex (located immediately below the wire forming the coil spring) and subtending an interior angle are deformed so as to protrude toward the spring bearing. Therefore, the area located immediately below the wire forming the coil spring is prevented from coming into contact with the spring bearing. This allows the area of the elastic sheet located immediately below the wire forming the coil spring to be more reliably restrained from being damaged. Therefore, the elastic sheet can be restrained from being broken.

Furthermore, an aspect of the present invention provides a suspension apparatus including a hydraulic shock absorber installed on a vehicle body side and on a wheel side, a coil spring, a spring bearing that supports the coil spring, and the elastic sheet interposed between the coil spring and the spring bearing.

Additionally, in the suspension apparatus, the spring bearing preferably includes a regulation portion that regulates deformation of the sidewall portions of the elastic sheet.

Such a configuration exerts the following effect. For example, when the coil spring is compressed to apply a compressive load to the elastic sheet, the load input to the elastic sheet (particularly the seating portion (located immediately below the coil spring)) is transmitted to the sidewall portions of the elastic sheet to deform (extend or compress) the sidewall portions. However, the regulation portion of the spring bearing can regulate the deformation of the sidewall portions of the elastic sheet. Thus, the suspension apparatus according to the aspect of the present invention (more specifically, the elastic sheet (installed in the suspension apparatus)) can distribute the pressure inside the elastic sheet throughout the elastic sheet without concentrating the pressure particularly at the seating portion (located immediately below the coil spring).

Furthermore, since the regulation portion regulates the deformation of the sidewall portions (parts of the sidewall portions which come into contact with the regulation portion), parts of the sidewall portions which are not in contact with the spring bearing are consequently deformed so as to come into tight contact with the coil spring (wire) along the coil spring (wire). This prevents a gap from being formed between the elastic sheet and the coil spring to allow the elastic sheet to maintain the appropriate contact with the coil spring. Accordingly, for example, even if the coil spring is repeatedly expanded and compressed, the elastic sheet can remain in tight contact with the coil spring, reducing "changes in the pressure" inside the elastic sheet (resulting from the repeated extension and compression of the coil spring).

A combination of these effects allows the suspension apparatus according to the aspect of the present invention to prevent the elastic sheet from being damaged to maintain the shape of the elastic sheet for a long period. As a result, sand, mud, or the like can be prevented from flowing in between the elastic sheet and the wire, thus preventing the coil spring from, for example, having its coating chipped or being broken.

The aspects of the present invention can provide an elastic sheet that can prevent the coil spring from, for example, having its coating chipped or being broken as a result of the entry of mud, sand, or the like, and a suspension apparatus with the elastic sheet.

DESCRIPTION OF THE PREFERRED EMBODIMENT

First Embodiment

A first embodiment of the present invention will be described with reference to FIG. 1 to FIG. 13.

<<Configuration of the Suspension Apparatus>>

A configuration of a suspension apparatus 300 will be described.

Figure 1:
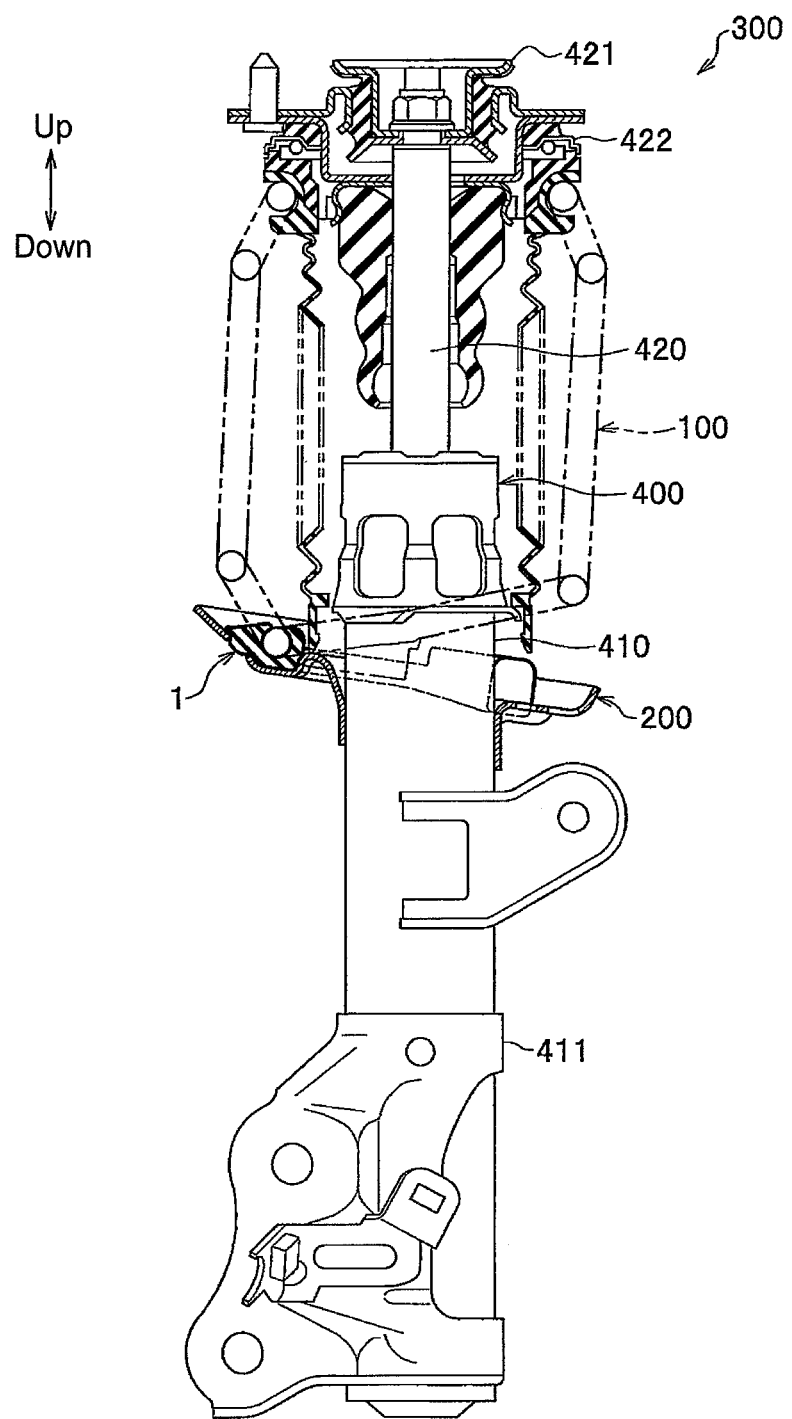
FIG. 1 is a vertical cross-sectional view of a suspension apparatus according to a first embodiment.
Figure 2:
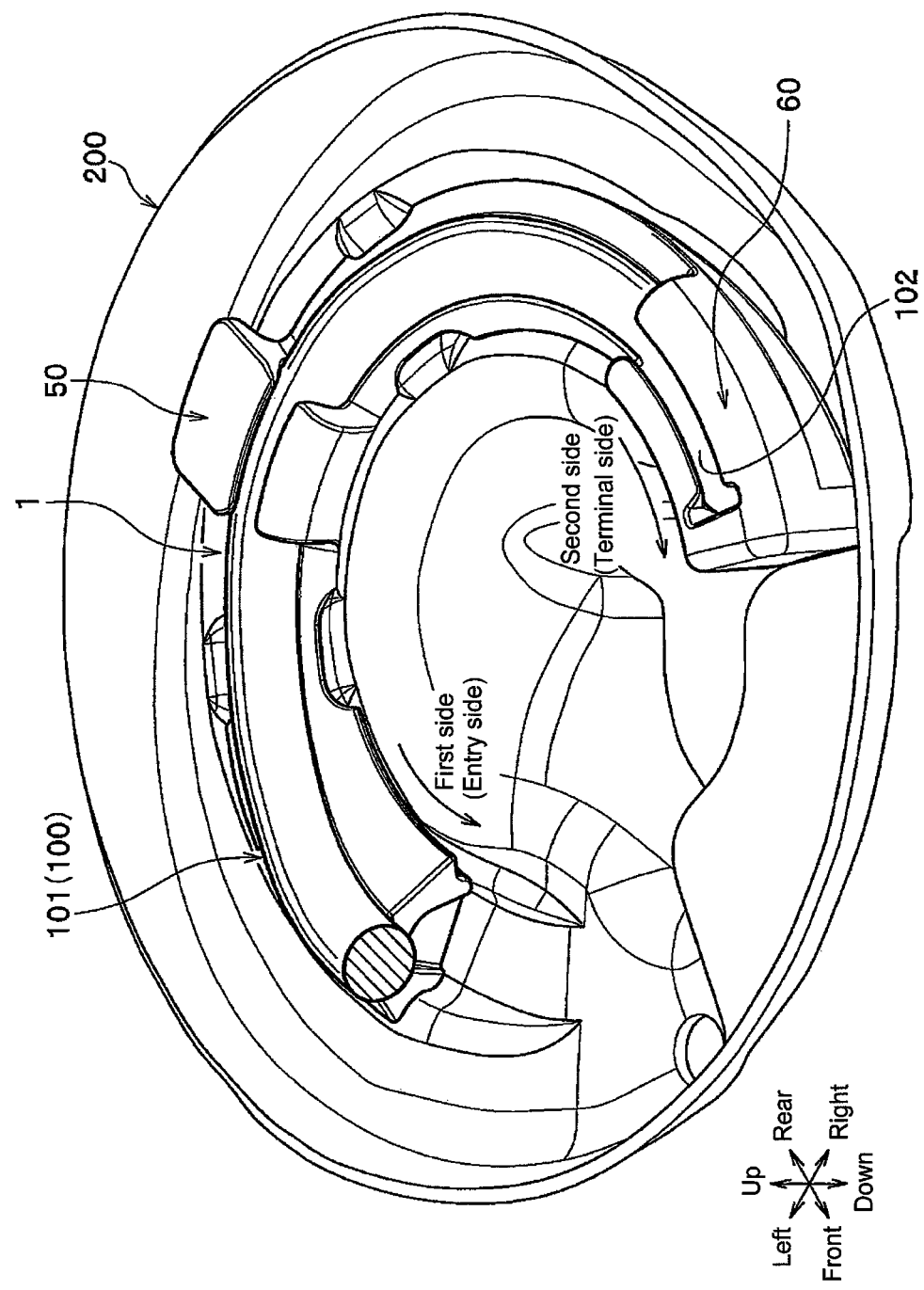
FIG. 2 is a perspective view of a rubber sheet and a spring bearing according to the first embodiment.
Figure 3:
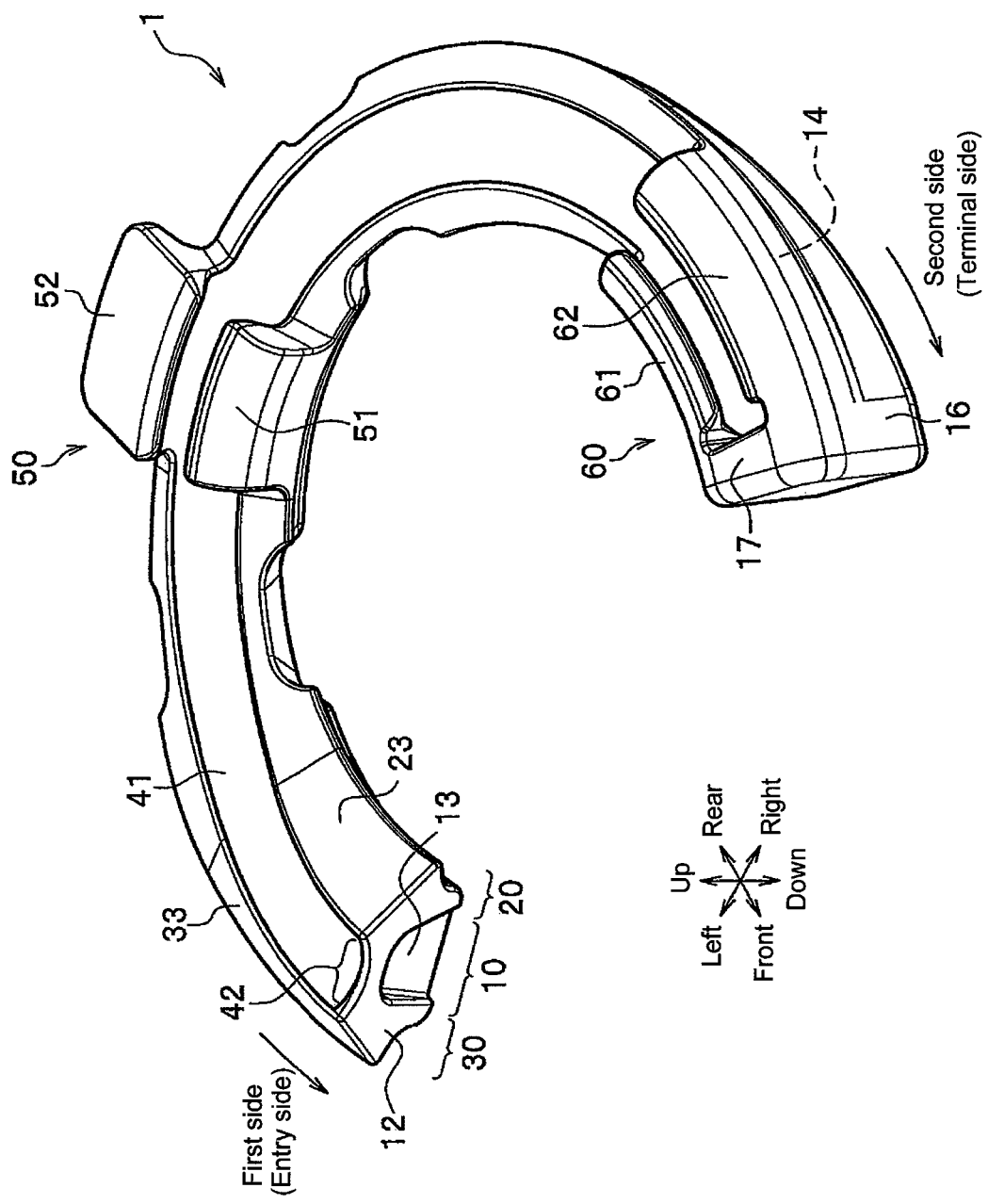
FIG. 3 is a perspective view of the rubber sheet according to the first embodiment.

As shown in FIG. 1, the suspension apparatus 300 is mounted in a four-wheel vehicle and forms a strut suspension. The suspension apparatus 300 includes a hydraulic shock absorber 400, a coil spring 100, a spring bearing 200, and a rubber sheet (elastic sheet) 1.

<Hydraulic Shock Absorber>

The hydraulic shock absorber 400 includes a damper case 410 forming an outer shell, a cylinder (not shown in the drawings) coaxially provided in the damper case 410, a piston (not shown in the drawings) that slides through the cylinder, and a piston rod 420 fixed to the piston and projecting upward. A lower end of the damper case 410 is connected to an upper arm and the like via a wheel side bracket 411. An upper end of the piston rod 420 is fixed to a vehicle body via a vehicle body side bracket 421. A spring bearing 422 is fixed to the vehicle body side bracket 421 to support an upper end of the coil spring 100.

<Coil Spring>

The coil spring 100 is a component externally installed around the hydraulic shock absorber 400 and extending in an up-down direction (axial direction). The coil spring 100 is formed by spirally rolling a wire 101.

<Spring Bearing>

The spring bearing 200 is a shallow dish-shaped component supporting the coil spring 100 from below, and is fixed to the damper case 410 in the first embodiment. The spring bearing 200 has a groove 210 (recess portion) in which the rubber sheet 1 is fitted and which is shaped like three-fifths of circle in a plan view (see FIG. 9).

A radial cross section of the groove 210 is approximately square U-shaped. The spring bearing 200 (more specifically, the groove 210) includes a regulation portion 212 that regulates deformation of sidewall portions (a first sidewall portion 20 and a second sidewall portion 30) of the rubber sheet 1 described below (see FIG. 9). The rubber sheet 1 will be described below. A radial side surface of the groove 210 according to the first embodiment corresponds to the regulation portion 212 according to the embodiments of the present invention.

Such a configuration exerts the following effect. For example, when the coil spring 100 is compressed to apply a compressive load to the rubber sheet 1, the load input to the rubber sheet 1 (particularly to a seating portion 10 (located immediately below the coil spring 100)) is transmitted to the sidewall portions (the first sidewall portion 20 and the second sidewall portion 30) of the rubber sheet 1 to deform (extend or compress) the sidewall portions (in a radial direction of the rubber sheet 1). However, the regulation portion 212 of the spring bearing 200 can regulate deformation of the sidewall portions of the rubber sheet 1. Thus, the radial deformation of the rubber sheet 1 is regulated to allow the pressure inside the rubber sheet 1 to be distributed throughout the rubber sheet 1 without concentrating the pressure particularly at the seating portion 10 (located immediately below the coil spring 100).

Furthermore, the regulation portion 212 regulates the deformation of the sidewall portions (which come into contact with the regulation portion 212), and as a result, parts of the rubber sheet 1 which are not in contact with the spring bearing 200 is deformed so as to come into tight contact with the coil spring 100 (wire 101) along the coil spring 100 (in an axial direction of the rubber sheet 1). This prevents a gap from being formed between the rubber sheet 1 and the coil spring 100 to allow the rubber sheet 1 to maintain the appropriate contact with the coil spring 100. Accordingly, for example, even if the coil spring 100 is repeatedly expanded and compressed, the rubber sheet 1 can remain in tight contact with the coil spring 100, reducing "changes in the pressure" inside the rubber sheet 1 (resulting from the repeated extension and compression of the coil spring 100).

A combination of these effects allows the suspension apparatus 300 according to the embodiments of the present invention to prevent the rubber sheet 1 from being damaged and to maintain the shape of the rubber sheet 1 for long period. As a result, the rubber sheet 1 can prevent sand, mud, or the like from flowing in between the rubber sheet 1 and the wire 101, thus preventing the coil spring 100 from, for example, having its coating chipped or being broken.

The width W210 of the groove 210 is formed to be slightly smaller than the width W1 of the rubber sheet 1 that has not been mounted yet (W210<W1). This allows sand, mud, or the like to be prevented from flowing into the groove 210 through between the rubber sheet 1 and the spring bearing 200. However, the width W210 of the groove 210 can be freely changed as appropriate.

A part of a bottom surface of the groove 210 on which an increased thick portion 16 described below is fitted includes a slope-shaped positioning portion 211 with a depth gradually increasing toward a second side (the side opposite to the entry side) (see FIG. 12). That is, the positioning portion 211 is formed by further recessing the groove 210 downward.

<Rubber Sheet>

The rubber sheet 1 will be described with reference to FIG. 2 to FIG. 13.

The rubber sheet 1 is a rubber component interposed between the coil spring 100 and the spring bearing 200. The rubber sheet 1 is shaped like about three-fifths of circle in a radial view (see FIG. 4) and is shaped like an approximately U-shaped in a vertical cross-sectional view (see FIG. 9). The rubber sheet 1 includes a seating portion 10, a first sidewall portion 20 (one sidewall portion of a pair of sidewall portions), and a second sidewall portion 30 (the other sidewall portion of the pair of sidewall portions).

The seating portion 10, the first sidewall portion 20, and the second sidewall portion 30 will be described in brief.

Figure 9:
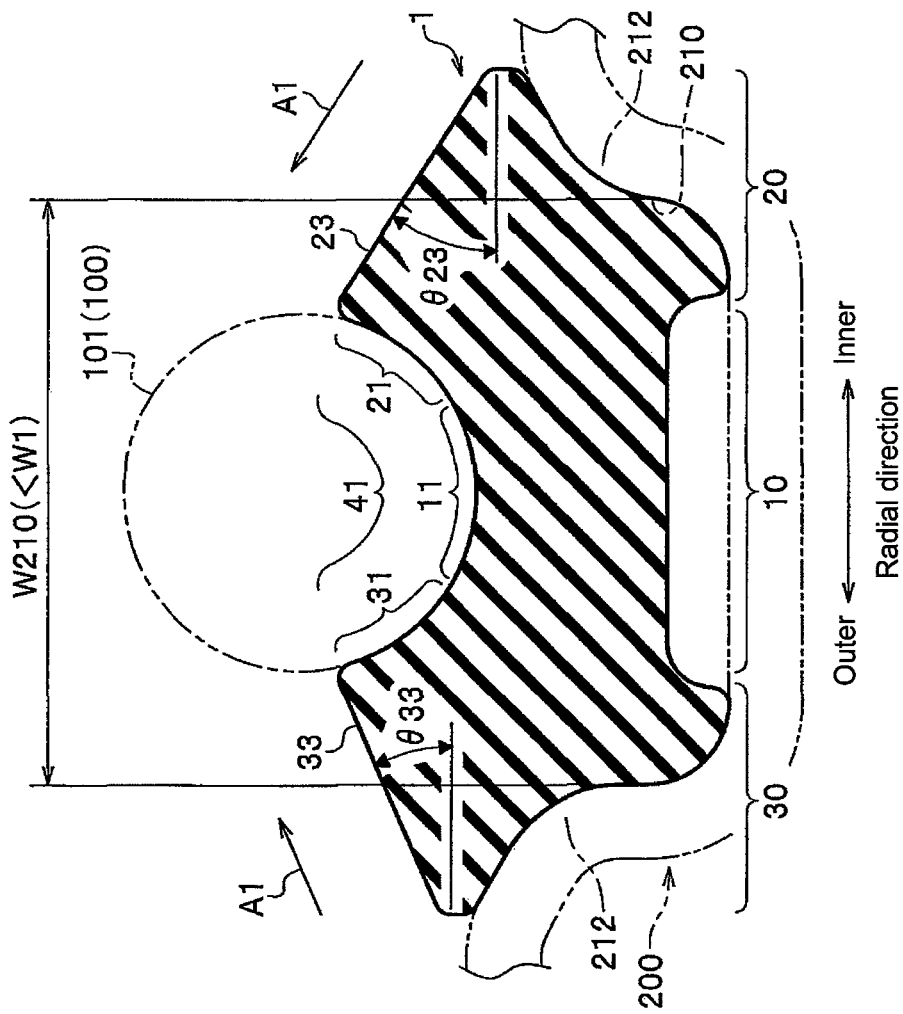
FIG. 9 is a cross-sectional view of the rubber sheet according to the first embodiment, corresponding to a cross section taken along line X3-X3 in FIG. 4.
Figure 10:
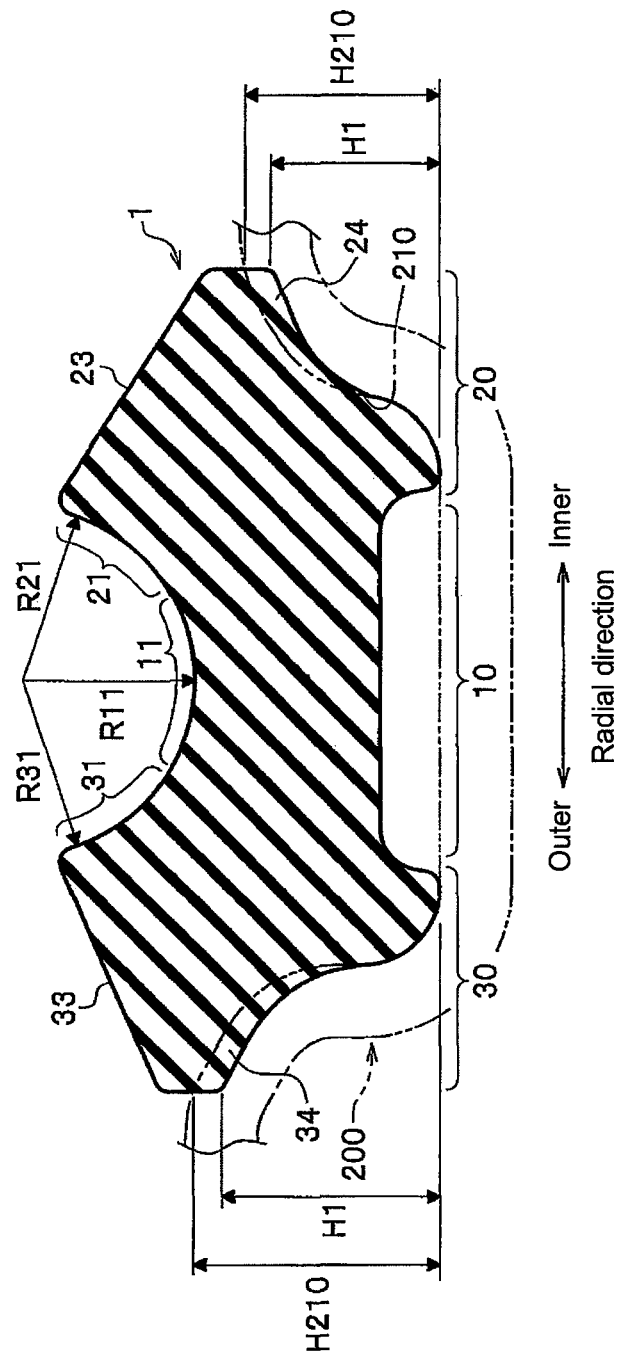
FIG. 10 is a cross-sectional view of the rubber sheet according to the first embodiment not installed on a spring bearing yet and on which a coil spring has not been installed yet, corresponding to a cross section taken along line X3-X3 in FIG. 4.

As shown in FIG. 9 and FIG. 10, the following radii are all the same and are set to be smaller than the radius R101 of the wire 101 in a radial cross-sectional view in the sole use of the rubber sheet 1 (which has not been attached to the spring bearing 200 and to which the coil spring 100 has not been attached): the radius of curvature R11 of an upper surface 11 of the seating portion 10, the radius of curvature R21 of a first inner side surface 21 (wire contact surface) of the first sidewall portion 20, and the radius of curvature R31 of a second inner side surface 31 (wire contact surface) of the second sidewall portion 30. Thus, after mounting of the coil spring 100, a gap is unlikely to be formed between the first inner side surface 21 and the second inner side surface 31 and the wire 101.

Furthermore, a first upper surface 23 (inclined surface) of the first sidewall portion 20 and a second upper surface 33 (inclined surface) of the second sidewall portion 30 have predetermined inclination angles ($\theta 23$ and $\theta 33$). Thus, sand, mud, or the like slides down the upper surfaces 23 and 33 and is unlikely to be collected thereon.

Moreover, a radial inner end of the first upper surface 23 and a radial inner end of the second upper surface 33 are located at lower position in the height direction than the center of the wire 101. Thus, the first sidewall portion 20 and the second sidewall portion 30 can efficiently and directly input a tightening force in the direction of arrow A1 in FIG. 9 to the wire 101 (without allowing the force to escape upward along an outer periphery of the wire 101), and come into tight contact with the wire 101.

The seating portion 10, the first sidewall portion 20, and the second sidewall portion 30 will be described below.

However, the peripheral length of the rubber sheet 1 is changed in association with the spiral diameter of the coil spring 100 and as appropriate within the range from one-third of circle to one-fifth of circle.

<Rubber Sheet-Seating Portion>

The seating portion 10 is a portion by which the coil spring 100 is supported and appears to have about three-fifths of circle in a plane view (in an axial view) of the seating portion 10. One circumferential side of the seating portion 10 corresponds to an entry side of the coil spring 100. Hence, when the coil spring 100 is compressed, a compressive load acting on the seating portion 10 is maximized on a first side (entry side). Repeated compression and extension of the coil spring 100 increases the range of variation in an axial (up-down direction) load acting on the seating portion 10. On the other hand, the other circumferential side of the seating portion 10 is a leading end side of the coil spring 100 and contacts a terminal 102 side of the wire 101 (see FIG. 2).

The upper surface 11 of the seating portion 10 is shaped like a circular arc in a radial cross-sectional view (see FIG. 9). The radius of curvature R11 of the upper surface 11 is smaller than the radius R101 of the wire 101. About quarter part of the first side (the entry side) of the seating portion 10 is gradually thicker toward an entry side end surface 12. The upper surface 11 forms a slope surface rising toward the first side (entry side) (see FIG. 3 and FIG. 6). Thus, the seating portion 10 is gradually thicker toward the first side (entry side) and is very thick and thus has an improved durability.

The seating portion 10 includes an end wall portion 17 formed on the second side (terminal side) (see FIG. 12) and protruding upward from the upper surface 11. The terminal 102 (lower side leading end) of the wire 101 come into abutting contact with the end wall portion 17 to position the rubber sheet 1 and the coil spring 100 in the circumferential direction thereof.

<Rubber Sheet—First Sidewall Portion>

The first sidewall portion 20 extends upward (toward the coil spring 100) from a radially (widthwise) inner side of the seating portion 10 (see FIG. 9). In a radial cross-sectional view, a first inner side surface 21 that is a wire 101 side surface of the first sidewall portion 20 is a wire contact surface shaped like a circular arc and which contact the wire 101. Before the wire 101 is mounted, the radius of curvature R21 of the first inner side surface 21 is smaller than the radius R101 of the wire 101. This prevents a gap from being formed between the first inner side surface 21 and the wire 101, thus preventing sand, mud, or the like from flowing into the first sidewall portion 20 through between the first inner side surface 21 and the wire 101.

The first upper surface 23 (coil spring 100 side surface) of the first sidewall portion 20 is an inclined surface inclined such that a widthwise outer side of the first upper surface 23 is closer to the spring bearing 200 side. That is, the first upper surface 23 is an inclined surface inclined such that the first upper surface 23 is closer to the spring bearing 200 as the first upper surface 23 extends radially outward from the first inner side surface 21 (wire contact surface). The "widthwise outer side" as used herein refers to the radially inner side. Thus, mud, sand, or the like on the first upper surface 23 slides down the first upper surface 23 radially outward, and is unlikely to be collected on the first upper surface 23.

<Rubber Sheet—Second Sidewall Portion>

The second sidewall portion 30 extends upward (toward the coil spring 100 side) from a radially (widthwise) outer side of the seating portion 10 (see FIG. 9). In a radial cross-sectional view, a second inner side surface 31 that is a wire 101 side surface of the second sidewall portion 30 is a wire contact surface shaped like a circular arc and which contact the wire 101. Before mounting of the wire 101, the radius of curvature R31 of the second inner side surface 31 is smaller than the radius R101 of the wire 101. This prevents a gap from being formed between the second inner side surface 31 and the wire 101, thus preventing sand, mud, or the like from flowing into the second sidewall portion 30 through between the second inner side surface 31 and the wire 101.

The second upper surface 33 (coil spring 100 side surface) of the second sidewall portion 30 is an inclined surface inclined such that a widthwise outer side of the second upper surface 33 is closer to the spring bearing 200 side. The "widthwise outer side" as used herein refers to the radially outer side. Thus, mud, sand, or the like on the second upper surface 33 slides down the second upper surface 33 radially outward, and is thus unlikely to be collected on the second upper surface 33.

At least one of the radius of curvature R21 of the first inner side surface 21 of the first sidewall portion 20 at an opening side (at a side closest to the first upper surface 23) and the radius of curvature R31 of the second inner side surface 31 of the second sidewall portion 30 at an opening side (at a side closest to the second upper surface 33) should be smaller than the radius R101 of the wire 101. That is, the radius of curvature R21 of the first inner side surface 21 of the first sidewall portion 20 and the radius of curvature R31 of the second inner side surface 31 of the second sidewall portion 30 may be partly larger or smaller. For example, the radius of curvature R21 of the entire first inner side surface 21 may be reduced or the radius of curvature exclusively of the upper portion (opening side portion) of the first inner side surface 21 may be reduced.

Furthermore, a lip (projection) extending circumferentially along the wire 101 may be formed on the first inner side surface 21 and the second inner side surface 31 to prevent sand, mud, or the like from flowing in between the wire 101 and the rubber sheet 1.

Moreover, the inclination angle θ23 of the first upper surface 23 and the inclination angle θ33 of the second upper surface 33 may be large and steep angles or may be small and gentle angles (see FIG. 9). For example, the inclination angle θ23 may be increased to prevent sand, mud, or the like from being collected.

<First Collapsing Margin and Second Collapsing Margin>

Furthermore, before mounting, the rubber sheet 1 includes a first collapsing margin 24 in a radially inner side portion of the first sidewall portion 20 and a second collapsing margin 34 in a radially outer side portion of the second sidewall portion 30 (see FIG. 10). The first collapsing margin 24 and the second collapsing margin 34 are formed on a spring bearing 200 side of the rubber sheet 1, and when collapsed, generates a tightening force that tightens the first sidewall portion 20 and the second sidewall portion 30 against the wire 101. That is, the first collapsing margin 24 and the second collapsing margin 34 mean parts of a solid portion of the rubber sheet 1 which are collapsed when the rubber sheet 1 is installed onto the spring bearing 200 and the weight of the coil spring 100 or the like acts on the first collapsing margin 24 and the second collapsing margin 34. The first collapsing margin 24 and the second collapsing margin 34 also mean parts of a solid portion of the rubber sheet 1 which interfere with the spring bearing 200.

With the above-described first collapsing margin 24 and second collapsing margin 34 provided to the rubber sheet 1, when the rubber sheet 1 is fitted into the spring bearing 200, the first collapsing margin 24 and the second collapsing margin 34 collapse to tighten the first sidewall portion 20 and the second sidewall portion 30 (more specially, a force in the direction of arrow A1 is exerted on the first sidewall portion 20 and the second sidewall portion 30) to bring the first sidewall portion 20 and the second sidewall portion 30 into tight contact with the wire 101 (see arrow A1 in FIG. 9).

In other words, a load (the weight of the coil spring 100 or the like) is continuously imposed on the rubber sheet 1 after the rubber sheet 1 is preset in the spring bearing 200 (after the suspension apparatus 300 is assembled on the vehicle), so that a force in the direction of arrow A1 can be exerted, bringing the first inner side surface 21 and the second inner side surface 31 into tight contact with the wire 101. This prevents sand, mud, or the like from flowing in between the rubber sheet 1 and the wire 101.

Furthermore, before mounting, the height H1 over which the rubber sheet 1 is fitted into the spring bearing 200 is set to be shorter than the depth H210 of the groove 210 in the spring bearing 200 (see FIG. 10). Thus, when the rubber sheet 1 is mounted onto the spring bearing 200, the rubber sheet 1 is elastically deformed, while coming into tight contact with the spring bearing 200. This prevents a gap from being formed between the rubber sheet 1 and the spring bearing 200 (see FIG. 9), thus preventing mud, sand, or the like from flowing in through a position where the rubber sheet 1 and the spring bearing 200 contact each other.

<Rubber Sheet—Lip>

Figure 4:
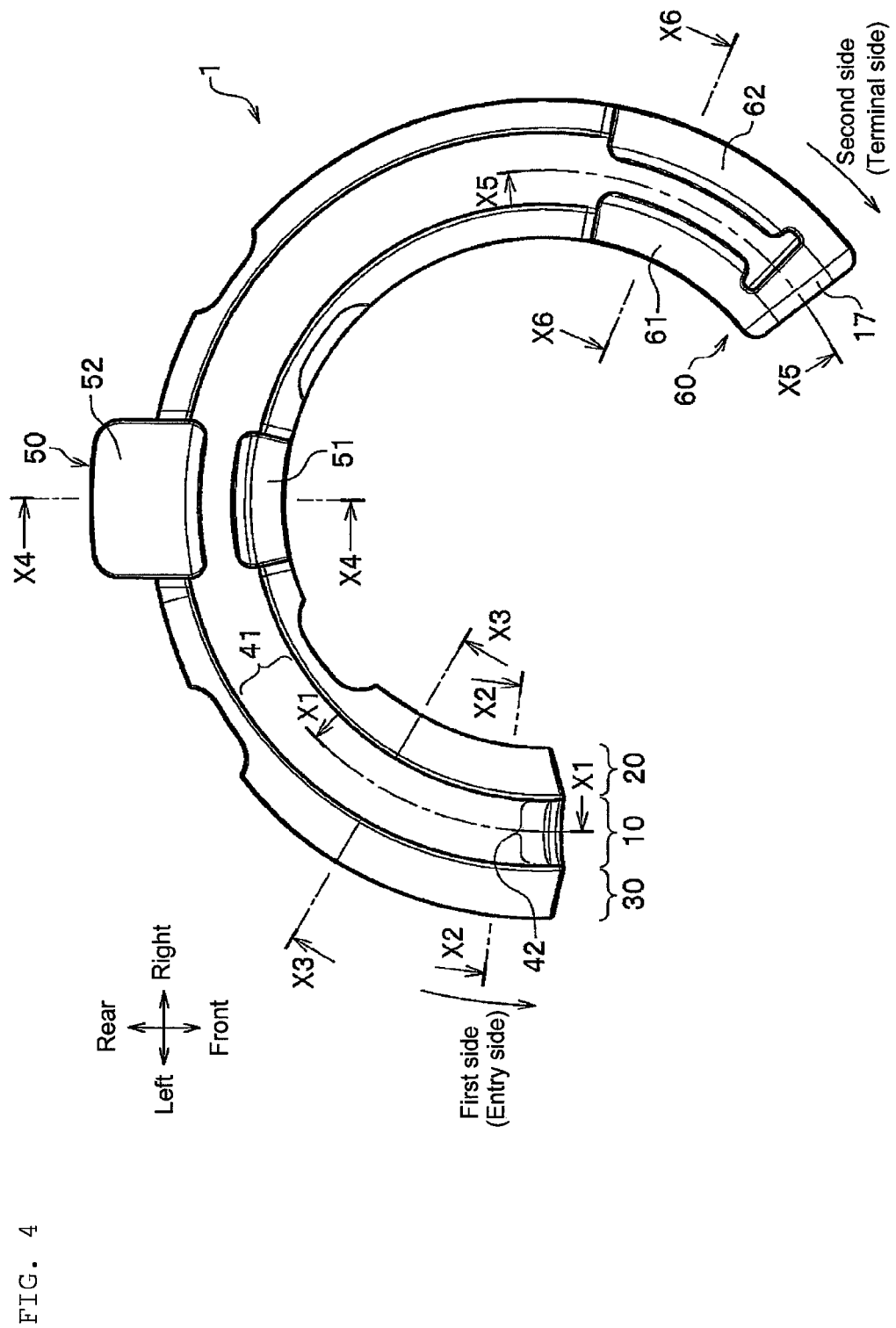
FIG. 4 is a top view (plan view) of the rubber sheet according to the first embodiment.

As shown in FIG. 9, in a radial cross-sectional view, a groove surface 41 of the rubber sheet 1 which contacts the coil spring 100 includes the upper surface 11 of the seating portion 10, the first inner side surface 21, the second inner side surface 31, and is shaped like a half circular arc (about half of circle). As shown in FIG. 4, the groove surface 41 extends circumferentially all over the rubber sheet 1 and includes a lip 42 (protruding portion; see FIG. 3, FIG. 4, and FIG. 7) formed on the first side (entry side) of the groove surface 41 and projecting toward the wire 101 (upward).

The lip 42 is formed radially all over the groove surface 41. The lip 42 is shaped like a crescent in a circumferential view, and the amount by which the lip 42 projects is largest at the center (radial center) of the groove surface 41 and decreases radially inward or outward from the center (see FIG. 8). In other words, the lip 42 projects most significantly toward the wire 101 (coil spring 100) at the center thereof.

Thus, the lip 42 is elastically deformed, while coming into contact with the wire 101. Consequently, even when repeated compression and extension of the coil spring 100 causes a load to be repeatedly imposed and released from between the coil spring 100 and the rubber sheet 1, the lip 42 is likely to remain contact with the wire 101. This further prevents a gap from being formed between the groove surface 41 and the wire 101 on the entry side. As a result, sand, mud, or the like is unlikely to flow in between the wire 101 and the rubber sheet 1 from the entry side of the rubber sheet 1.

<Rubber Sheet—Entry Side End Surface and Entry Side Recess Portion>

Figure 7:
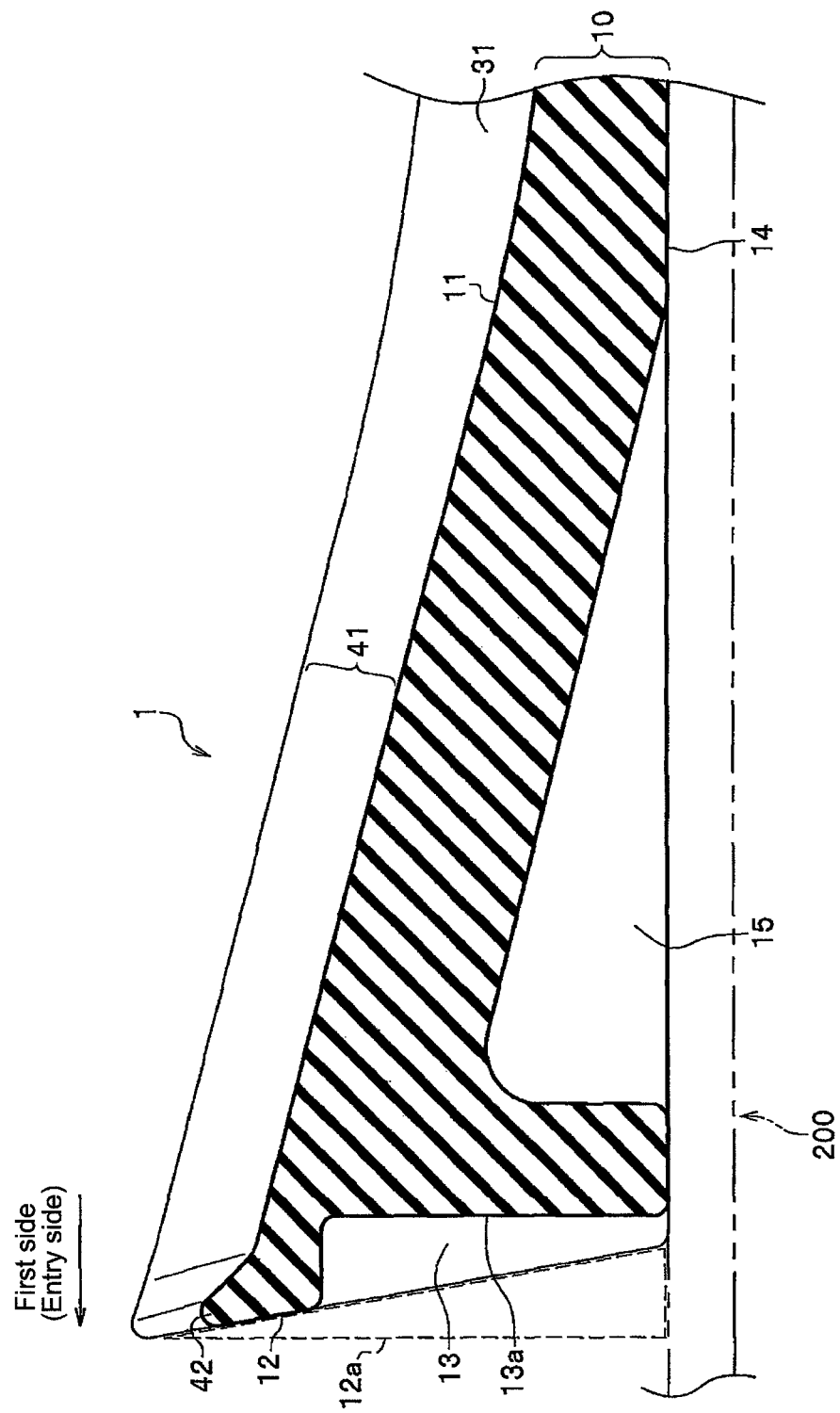
FIG. 7 is a cross-sectional view of the rubber sheet according to the first embodiment, corresponding to a cross section taken along line X1-X1 in FIG. 4.

As shown in FIG. 7, the entry side end surface 12 of the seating portion 10 is oblique so that the spring bearing 200 side is recessed in the circumferential direction of the seating portion 10. Thus, in a circumferential cross-sectional view, an escape space 12a shaped like a right triangle and into which the seating portion 10 escapes (into which some parts of the seating portion 10 move) during deformation is formed below the entry side end surface 12.

At the entry side end surface 12, an entry side recess portion 13 (first hollow portion or first recess portion) is formed. The circumferential depth of the entry side recess portion 13 gradually increases upward.

With the entry side recess portion 13 formed, the following effect is exerted. If the coil spring 100 is compressed to apply a compressive load to the rubber sheet 1, the seating portion 10 is deformed so as to extend in the circumferential direction thereof (due to the escape of the volume of the collapsed rubber sheet 1). However, at the entry side of the coil spring 100, the deformed seating portion 10 partly escapes into the entry side recess portion 13 (first recess portion) formed at the entry side end surface 12 of the coil spring 100 of the seating portion 10.

This precludes the entry side end surface 12 (which contacts the coil spring) from projecting beyond the entry side end surface 12, allowing the entry of sand, mud, or the like to be prevented. In addition, at the entry side of the coil spring 100, an excessive pressure from the coil spring 100 can be prevented from being locally applied. As a result, at the entry side of the coil spring 100, the seating portion 10 and the wire 101 can be prevented from rubbing each other (from coming into sliding contact with each other). Thus, even if sand, mud, or the like flows in between the seating portion 10 and the wire 101, the coil spring 100 can be prevented from, for example, having its coating chipped or being broken.

Moreover, in the rubber sheet 1, the entry side end surface 12 of the coil spring 100 of the seating portion 10 is oblique so that the spring bearing 200 side of the rubber sheet 1 is recessed, according to the present embodiment.

Thus, at the entry side end surface 12 (of the rubber sheet 1), a spring bearing 200 side end portion of the rubber sheet 1 is located circumferentially inward (the opposite side to the entry side) of a coil spring 100 side end of the rubber sheet 1. This makes a situation unlikely to occur in which the entry side end surface 12 (of the rubber sheet 1) collapses around the spring bearing 200 side end portion, displacing the position of the coil spring 100 side end portion relative to the coil spring 100. In short, the contact portion between the rubber sheet 1 and the coil spring 100 at the entry side end surface 12 of the rubber sheet 1 can be made constant, facilitating prevention of possible rubbing (sliding contact) between the rubber sheet 1 and the coil spring 100.

Thus, even if, for example, sand, mud, or the like flows in between the seating portion 10 and the wire 101, the coil spring 100 can be prevented from, for example, having its coating chipped or being broken.

<Rubber Seat—Spring Bearing Recess Portion>

Figure 5:
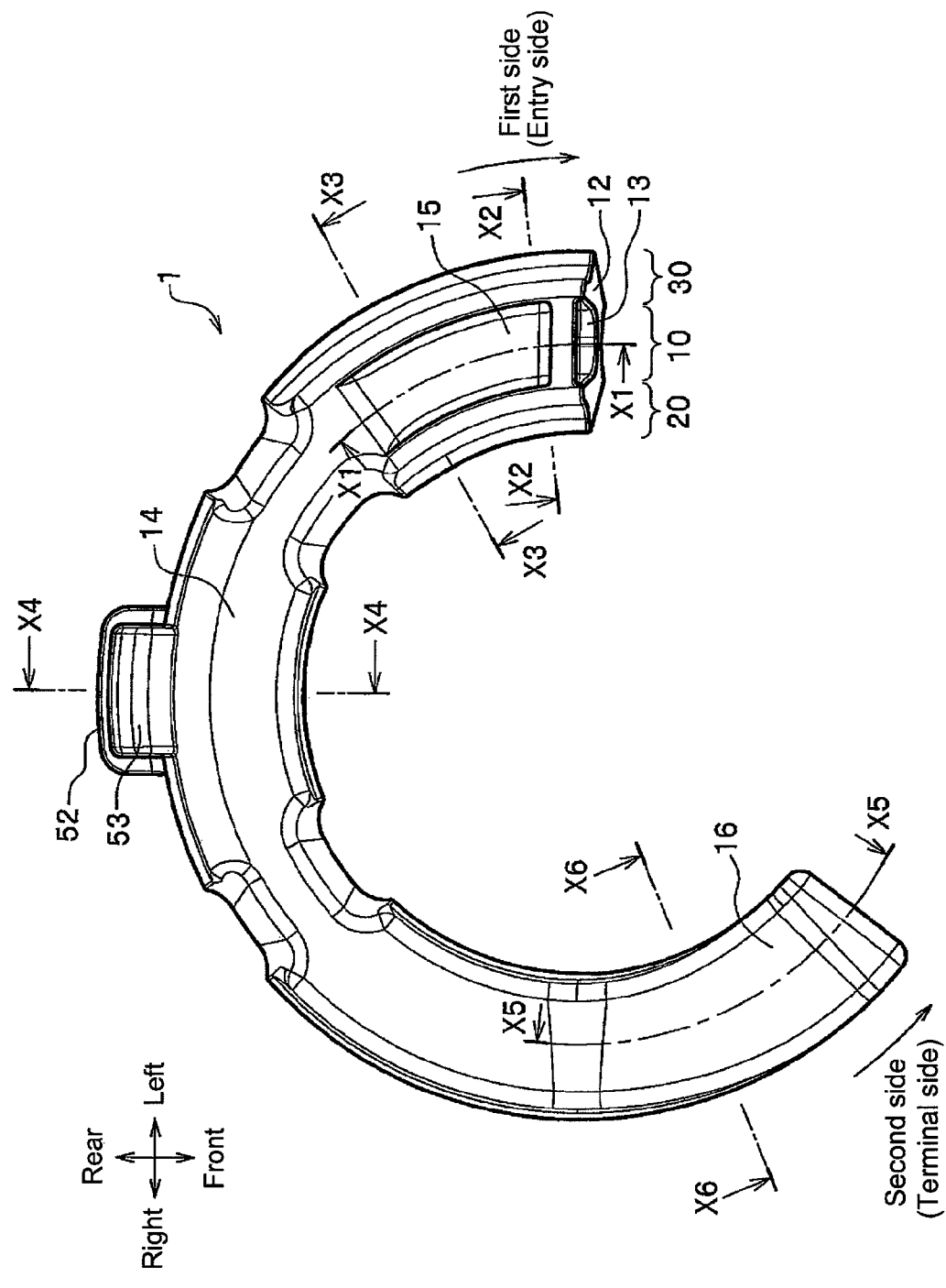
FIG. 5 is a bottom view of the rubber sheet according to the first embodiment.

The seating portion 10 includes a spring bearing side recess portion 15 (second hollow portion or second recess portion) formed on a back surface 14 thereof (spring bearing 200 side surface) and which is open toward the spring bearing 200 side and which extends in the circumferential direction of the spring bearing 200 (see FIG. 5 and FIG. 7).

According to such a configuration, when, for example, the coil spring 100 is compressed to apply a compressive load to the rubber sheet 1, a part, of the seating portion 10 located immediately below the coil spring 100 and most significantly deformed escapes into the spring bearing side recess portion 15 formed at the opposite back surface 14 (spring bearing side surface) of the seating portion 10. This prevents the deformed seating portion 10 from coming into contact with the spring bearing 200, thus allowing the rubber sheet 1 (particularly the seating portion 10) to be prevented from being damaged. Furthermore, the seating portion 10 is prevented from extending in the radial direction thereof, allowing the shape of the rubber sheet 1 to be maintained.

Moreover, in conjunction with the escape of the seating portion 10 into the spring bearing side recess portion 15 (second recess portion), the sidewall portions (first sidewall portion 20 and second sidewall portion 30) are deformed toward the seating portion 10 and comes into tight contact with the wire 101 (of the coil spring 100). This prevents sand, mud, or the like from flowing in between the seating portion 10 and the wire 101.

A combination of these effects allows the present configuration to prevent the rubber sheet 1 (particularly the seating portion 10) from being damaged, while preventing the coil spring 100 from, for example, having its coating chipped or being broken.

Figure 8:
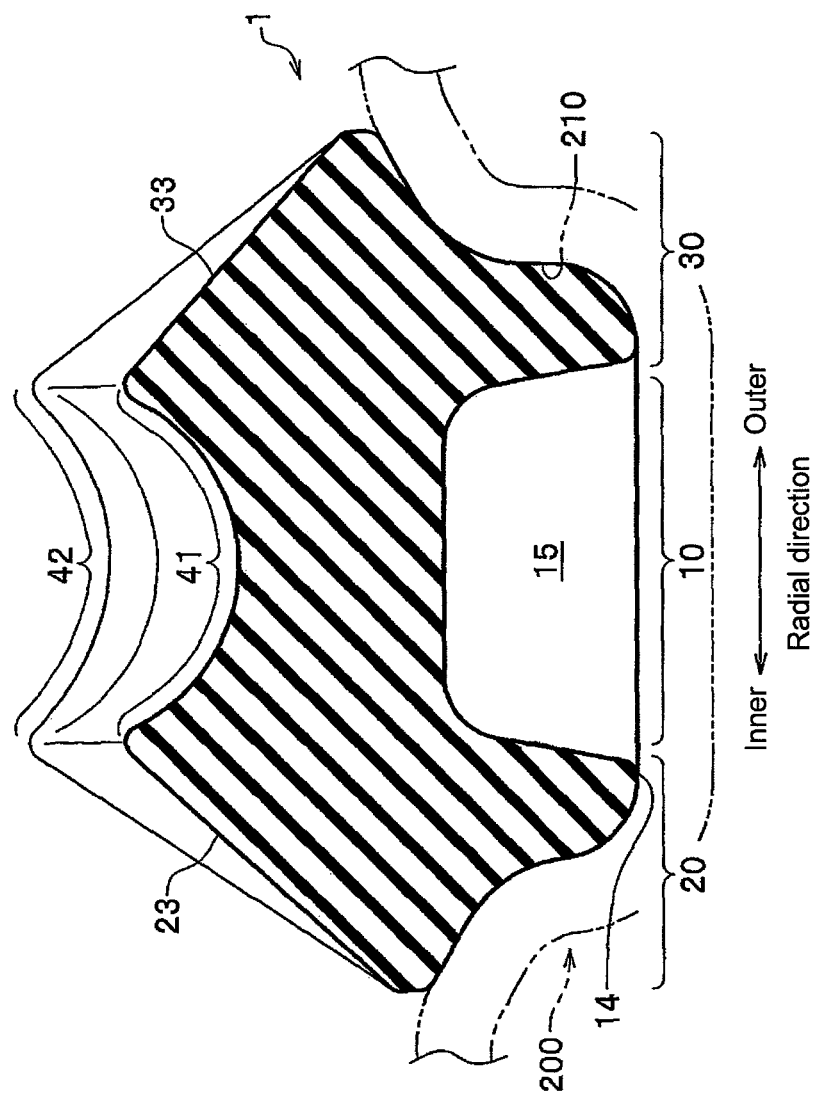
FIG. 8 is a cross-sectional view of the rubber sheet according to the first embodiment, corresponding to a cross section taken along line X2-X2 in FIG. 4.
Figure 17:
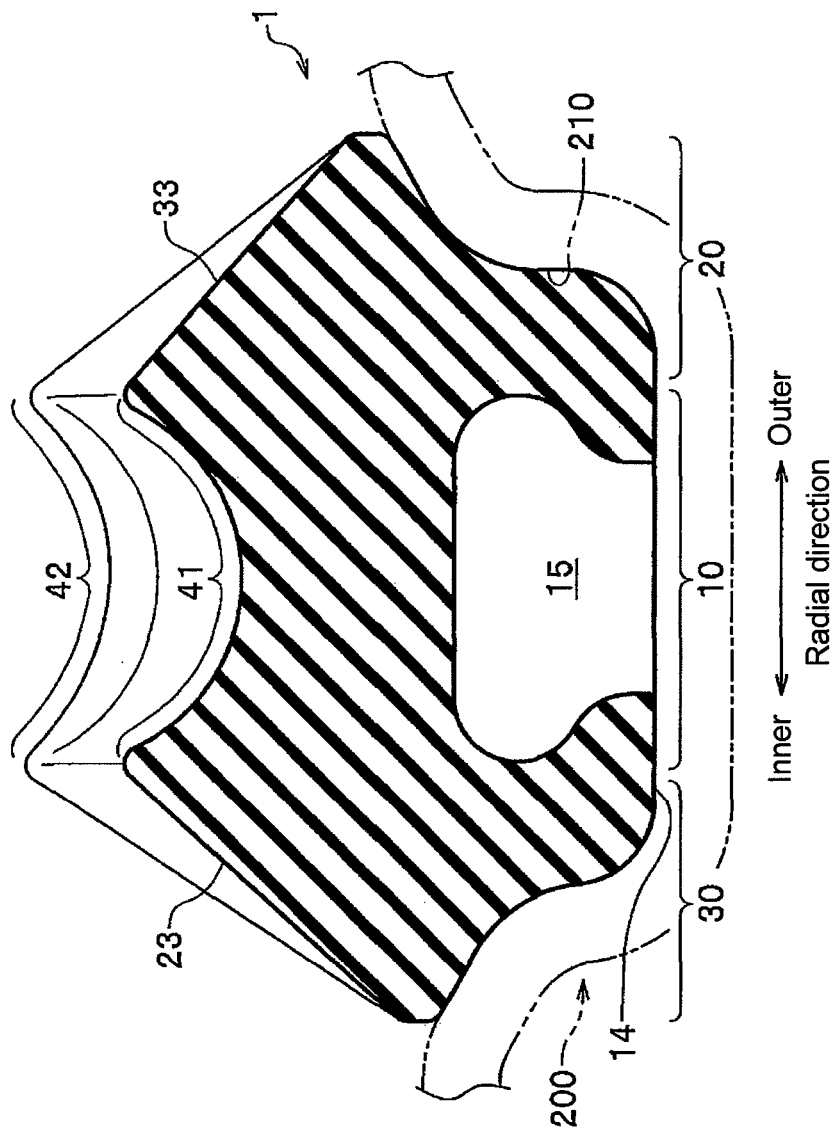
FIG. 17 is a cross-sectional view of a rubber sheet according to a variation, corresponding to a cross section taken along line X2-X2 in FIG. 5.

The spring bearing side recess portion 15 is shaped like a rectangular in a radial cross-sectional view (see FIG. 8). Alternatively, the spring bearing side recess portion 15 may be shaped like a semicircle. Alternatively, as shown in FIG. 17, the spring bearing side recess portion 15 may be formed such that the size of the spring bearing side recess portion 15 increases upward relative to the opening width.

The circumferential length of the spring bearing side recess portion 15 corresponds to the length of a thick portion of the first side (entry side) of the seating portion 10. The spring bearing side recess portion 15 is shaped like a slope which is deepest on the entry side thereof likely to be subjected to a compressive load during compression and which is gradually shallower away from the entry side thereof, so that the thickness of the rubber portion constituting the seating portion 10 is constant. However, the depth of the spring bearing side recess portion 15 may be constant in the circumferential direction of the spring bearing side recess portion 15.

Thus, when the coil spring 100 is compressed to apply a compressive load to the rubber sheet 1, a part of the seating portion 10 escapes into the spring bearing side recess portion 15. Therefore, the deformed seating portion 10 and the wire 101 are unlikely to come into sliding contact with each other, preventing the seating portion 10 from being damaged and restraining a gap from being formed between the seating portion 10 and the wire 101.

Alternatively, the spring bearing side recess portion 15 may include a rib (not shown in the drawings) formed at a circumferentially intermediate position thereof and extending in the circumferential direction thereof to abut against the spring bearing 200. This may increase the strength of the seating portion 10 at the entry side, while allowing the rubber to escape when a compressive load is applied to the rubber sheet 1.

<Rubber Sheet—Thick Portion>

Figure 12:
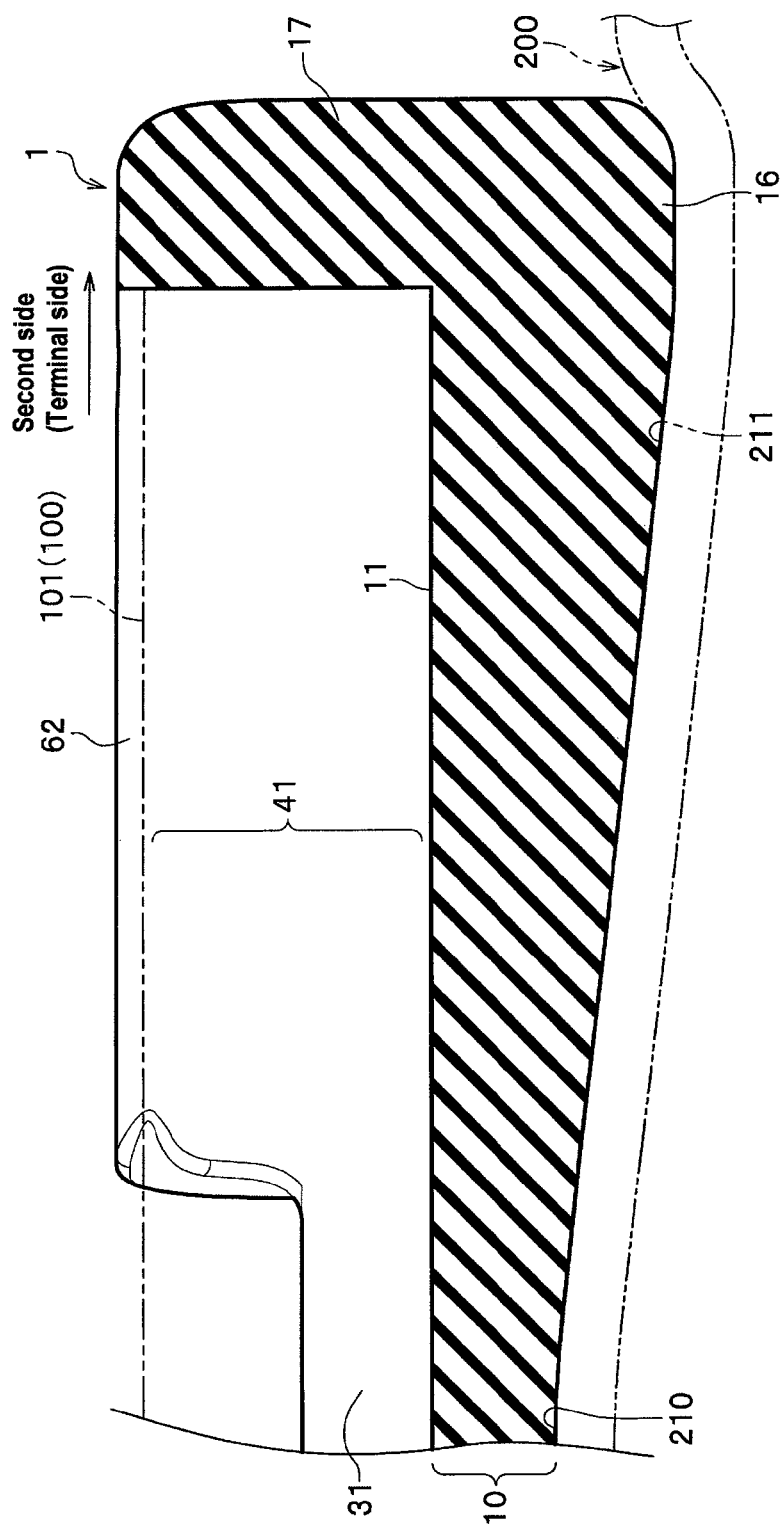
FIG. 12 is a cross-sectional view of the rubber sheet according to the first embodiment, corresponding to a cross section taken along line X5-X5 in FIG. 4.

The seating portion 10 includes a thick portion 16 formed at the second side (terminal side; the side opposite to the entry side) and which is thick toward the spring bearing 200 (see FIG. 12). Thus, the seating portion 10 has an increased durability on the second side and can thus maintain the shape of the rubber sheet 1. On the other hand, the spring bearing 200 includes a positioning portion 211 formed thereon and to which the thick potion 16 is fitted.

<Rubber Sheet—First Slip-Off Prevention Portion and Second Slip-Off Prevention Portion>

The rubber sheet 1 includes a first slip-off prevention portion 50 and a second slip-off prevention portion 60. The first slip-off prevention portion 50 and the second slip-off prevention portion 60 prevent the rubber sheet 1 from slipping off from the coil spring 100 after the rubber sheet 1 is mounted to the coil spring 100. The first slip-off prevention portion 50 is disposed at a circumferentially intermediate position of the rubber sheet 1. The second slip-off prevention portion 60 is disposed at the second side (terminal side) of the rubber sheet 1.

Figure 11:
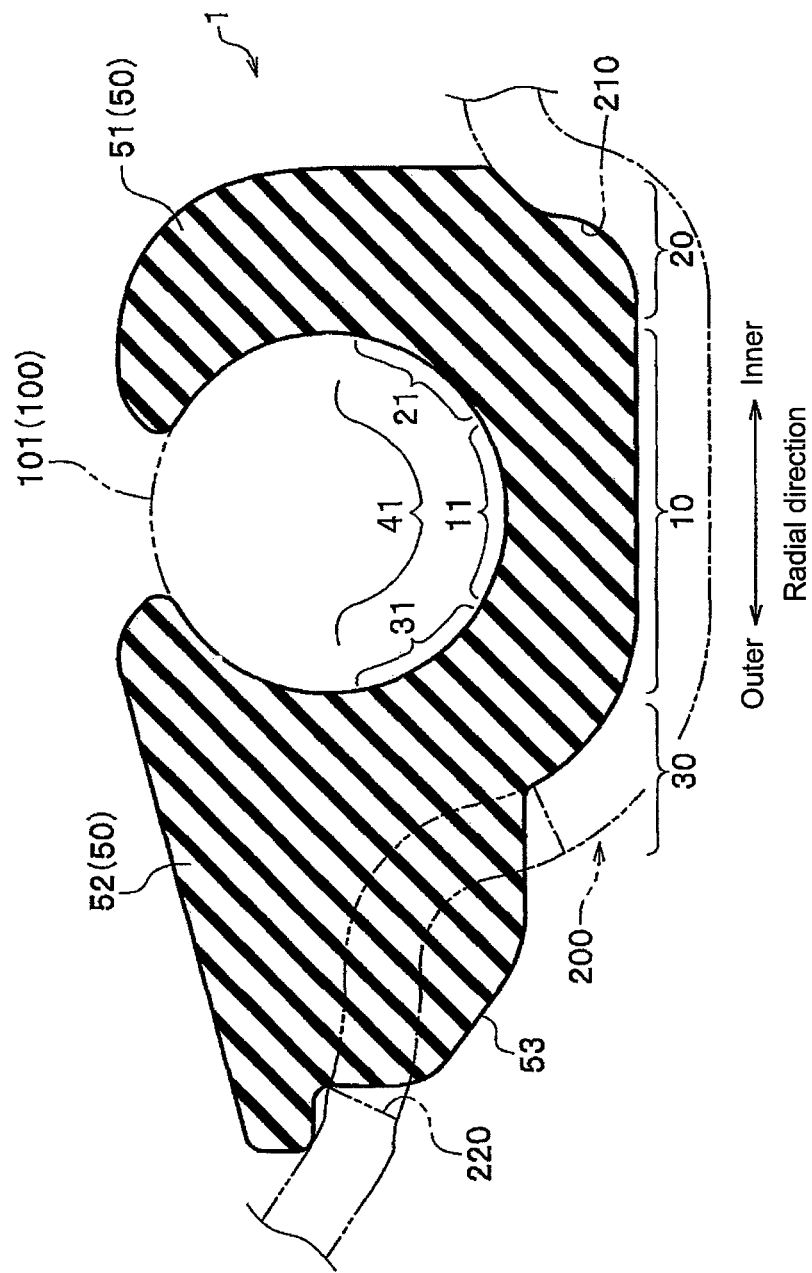
FIG. 11 is a cross-sectional view of the rubber sheet according to the first embodiment, corresponding to a cross section taken along line X4-X4 in FIG. 4.

As shown in FIG. 11, the first slip-off prevention portion 50 includes a first A slip-off prevention piece 51 projecting upward from the first sidewall portion 20 and extending radially outward so as to surround the wire 101 and a first B slip-off prevention piece 52 projecting upward from the second sidewall portion 30 and extending radially inward so as to surround the wire 101.

Figure 6:
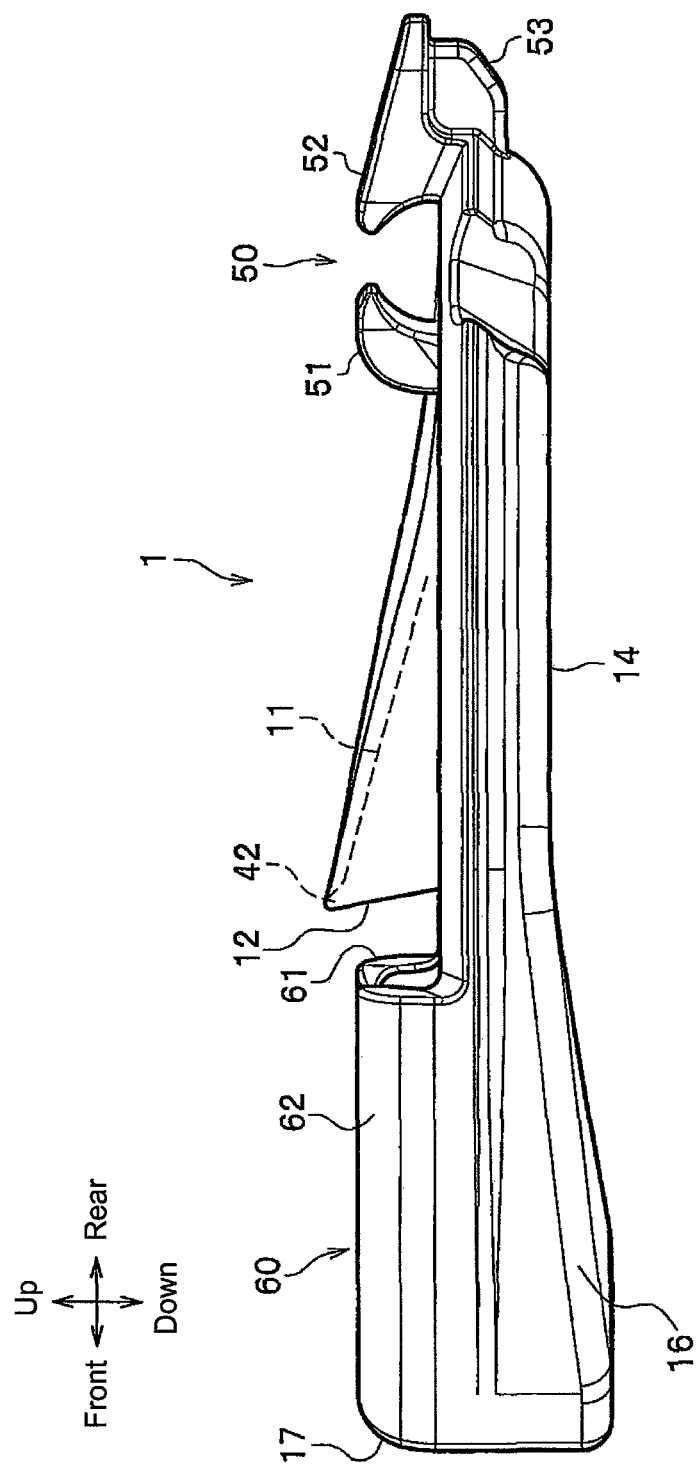
FIG. 6 is a right side view of the rubber sheet according to the first embodiment.

A protruding portion 53 projecting toward the spring bearing 200 side and extending slightly in the circumferential direction is formed below the first B slip-off prevention piece 52 (see FIG. 6 and FIG. 11). A protruding portion 53 is inserted into a positioning hole 220 of the spring bearing 200 to position the rubber sheet 1 and the spring bearing 200 in the circumferential direction.

Figure 13:
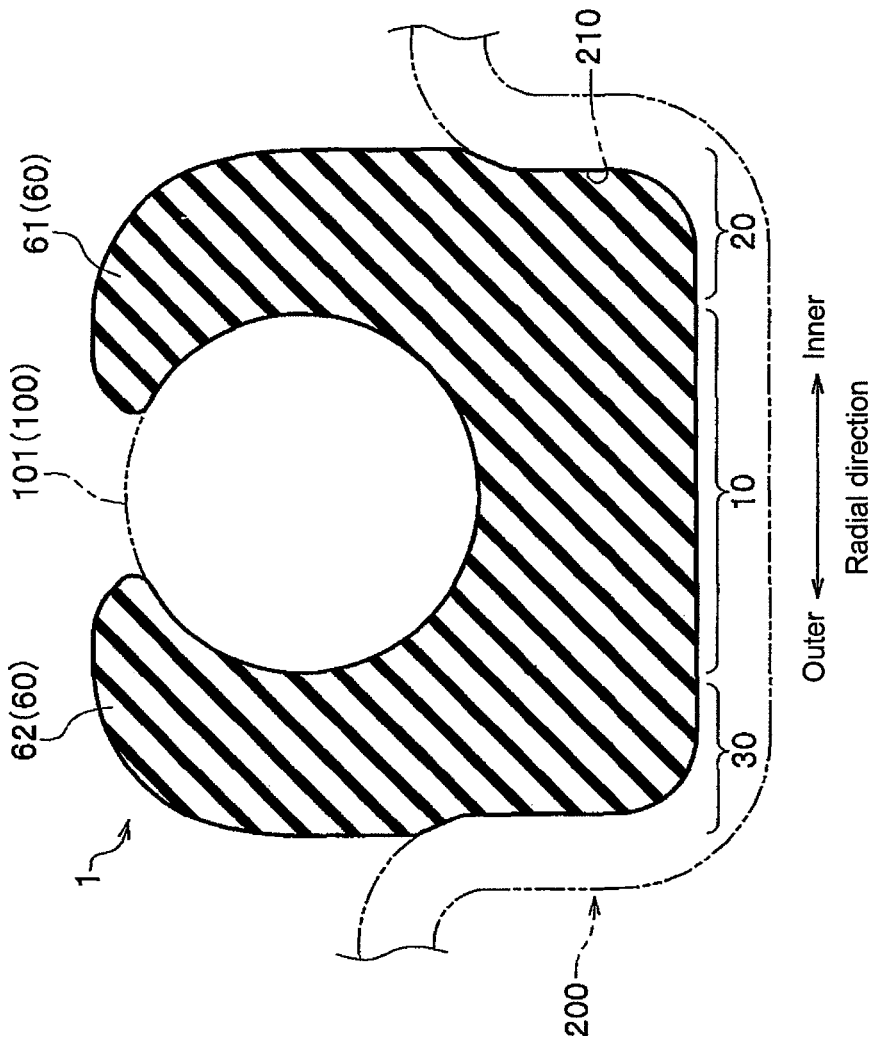
FIG. 13 is a cross-sectional view of the rubber sheet according to the first embodiment, corresponding to a cross section taken along line X6-X6 in FIG. 4.

As shown in FIG. 13, the second slip-off prevention portion 60 includes a second A slip-off prevention piece 61 projecting upward from the first sidewall portion 20 and extending radially outward so as to surround the wire 101 and a second B slip-off prevention piece 62 projecting upward from the second sidewall portion 30 and extending radially inward so as to surround the wire 101.

As shown in FIG. 13, the second slip-off prevention portion 60 has an upper opening through which the terminal 102 of the coil spring 100 can be easily inserted. Thus, the terminal 102 can be easily installed (mounted), and the assembled coil spring 100 is held.

<<Effects of the Rubber Sheet>>

The effects of the rubber sheet 1 will be described.

The radius of curvature R21 of the first inner side surface 21 of the first sidewall portion 20 and the radius of curvature R31 of the second inner side surface 31 of the second sidewall portion 30 are both smaller than the radius R101 of the wire 101 (see FIG. 9). Thus, the first sidewall portion 20 and the second sidewall portion 30 tighten the wire 101 (see arrow A1 in FIG. 9). This brings the first sidewall portion 20 and the second sidewall portion 30 into tight contact with the wire 101, preventing a gap from being formed between the wire 101 and each of the first sidewall portion 20 and the second sidewall portion 30. Thus, mud, sand, or the like is unlikely to flow in between the wire 101 and each of the first sidewall portion 20 and the second sidewall portion 30, thus allowing the coil spring 100 to be prevented from, for example, having its coating chipped or being broken.

Furthermore, the first upper surface 23 of the first sidewall portion 20 is inclined such that the radially inner side of the first upper surface 23 approaches the spring bearing 200. Thus, mud, sand, or the like slides down the first upper surface 23 radially outward. This prevents mud, sand, or the like from flowing in between the first sidewall portion 20 and the wire 101.

Similarly, the second upper surface 33 of the second sidewall portion 30 is inclined such that the radially outer side of the second upper surface 33 approaches the spring bearing 200. Thus, mud, sand, or the like slides down the second upper surface 33 radially outward. This prevents mud, sand, or the like from flowing in between the second sidewall portion 30 and the wire 101.

Moreover, the rubber sheet 1 includes the seating portion 10 and the first sidewall portion 20 and the second sidewall portion 30 (what is called an upper opening structure) and does not include a cylindrical holding portion through which the wire 101 (coil spring 100) is inserted. This allows the rubber sheet 1 and the coil spring 100 to be easily assembled together.

More specifically, for example, the rubber sheet 1 and the coil spring 100 assembled together (an assembly of the coil spring 100 and the rubber sheet 1) can be assembled onto the spring bearing 200, as described below. In short, the suspension apparatus 300 can be partly and easily assembled, resulting in enhanced assembly performance.

<<Method for Assembling the Rubber Sheet>>

Now, a method for assembling the rubber sheet 1 will be described.

<Assembly with the Coil Spring>

First, the rubber sheet 1 and the coil spring 100 are assembled together.

Specifically, the terminal 102 of the coil spring 100 and the end wall portion 17 of the rubber sheet 1 are aligned together, and then the coil spring 100 is pushed into the rubber sheet 1. This elastically deforms the first A slip-off prevention piece 51 and first B slip-off prevention piece 52 of the first slip-off prevention portion 50 and the second A slip-off prevention piece 61 and second B slip-off prevention piece 62 of the second slip-off prevention portion 60 to fit the wire 101 between the first A slip-off prevention piece 51 and the first B slip-off prevention piece 52 and between second A slip-off prevention piece 61 and the second B slip-off prevention piece 62. The wire 101 is thus seated at (supported by) the seating portion 10.

Simultaneously with the seating, the wire 101 comes into contact with the groove surface 41 (the upper surface 11, the first inner side surface 21, and the second inner side surface 31). Subsequently, the first A slip-off prevention piece 51 and the first B slip-off prevention piece 52 are locked on the upper surface of the wire 101 (see FIG. 11), and the second A slip-off prevention piece 61 and the second B slip-off prevention piece 62 are also locked on the upper surface of the wire 101 (FIG. 13). This prevents the rubber sheet 1 from slipping out from the coil spring 100 after the rubber sheet 1 is installed over the coil spring 100.

<Assembly with the Spring Bearing>

Second, the rubber sheet 1 and the spring bearing 200 are assembled together.

Specifically, the protruding portion 53 is aligned with the spring bearing 200, and then, the thick portion 16 of the rubber sheet 1 and the positioning portion 211 of the spring bearing 200 are aligned with each other. Subsequently, the rubber sheet 1 and the coil spring 100 are arranged at the spring bearing 200 side.

Then, the rubber sheet 1 is fitted into the groove 210 (see FIG. 9) of the spring bearing 200. The first collapsing margin 24 and the second collapsing margin 34 (see FIG. 10) are compressed in the radial direction of the rubber sheet 1. The first sidewall portion 20 and the second sidewall portion 30 sandwich the wire 101 between the sidewall portions 20 and 30 while tightening the wire 101, in the radial direction. Thus, the first sidewall portion 20 and the second sidewall portion 30 further tightly contact the wire 101.

<<Variation>>

The embodiment of the present invention has been described. However, the present invention is not limited to the embodiment, and the embodiment may be varied, for example, as described below.

In the above-described embodiment, the configuration has been illustrated in which the first upper surface 23 and the second upper surface 33 are linear in a radial cross section as shown in FIG. 9. However, the present invention is not limited to this configuration. The first upper surface 23 and the second upper surface 33 should be shaped to generate a force in a direction in which the first sidewall portion 20 and the second sidewall portion 30 come into tight contact with the wire 101 to be tightened and be also shaped to prevent sand, mud, or the like from being collected in the neighborhood of the first upper surface 23 and the second upper surface 33, and for example, the first upper surface 23 may be curved provided that the first upper surface 23 is lower at the radially inner side than at the radially outer side. This also applies to the second upper surface 33. Thus, the rubber sheet 1 may have a radial cross section which generally spreads toward the spring bearing 200 in a curved manner, that is, which may have a trapezoidal shape like a barrel.

In the above-described embodiment, the configuration has been illustrated in which the entry side recess portion 13 is formed at the entry side end surface 12 as shown in FIG. 7. Alternatively, for example, the formation of the entry side recess portion 13 may be omitted.

Figure 14:
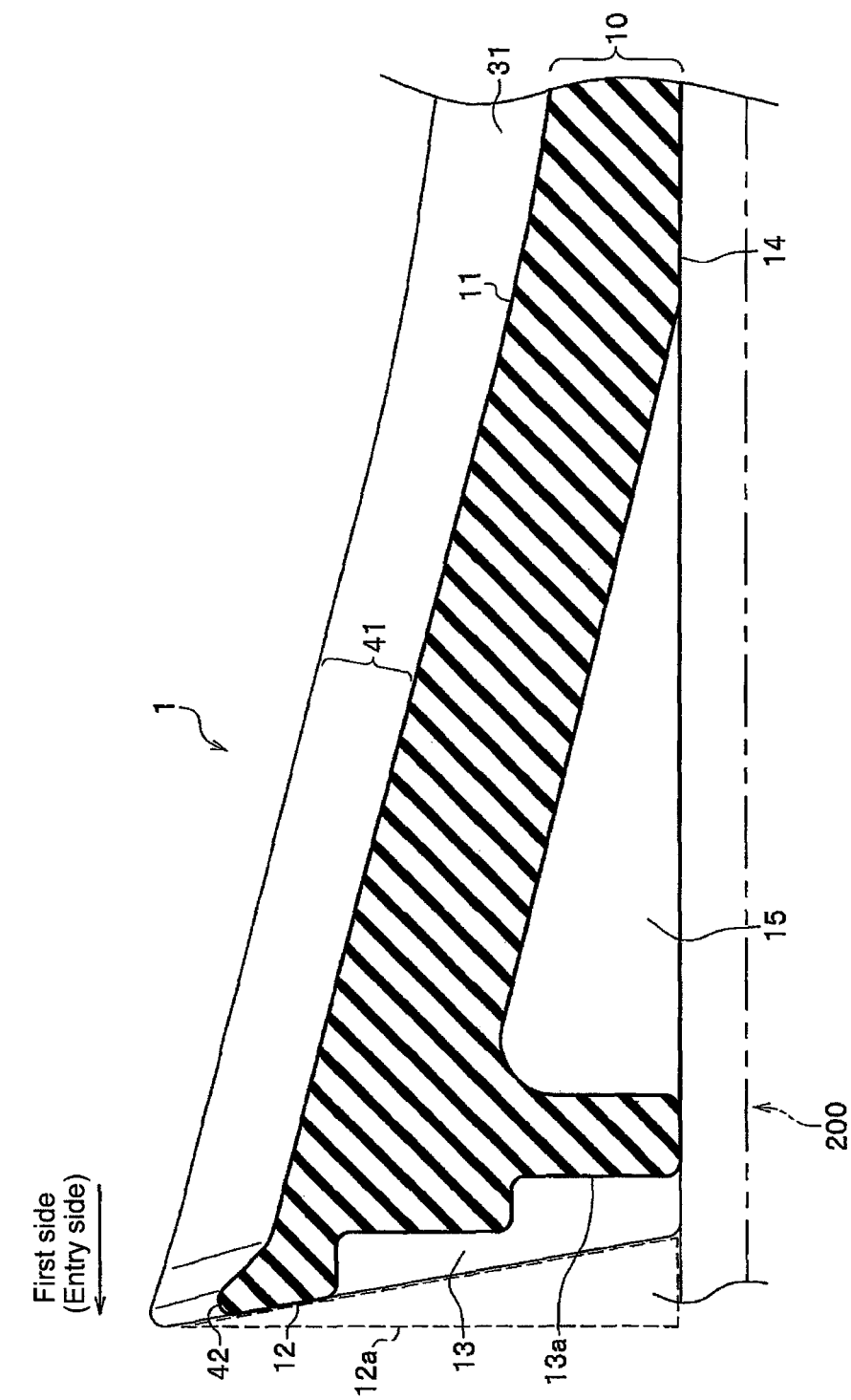
FIG. 14 is a cross-sectional view of a rubber sheet according to a variation, corresponding to a cross section taken along line X1-X1 in FIG. 4.

In the above-described embodiment, the configuration has been illustrated in which the circumferential depth of the entry side recess portion 13 from the entry side end surface 12 gradually increases upward as shown in FIG. 7. Alternatively, for example, a bottom surface 13a of the entry side recess portion 13 may be formed of a plurality of steps as shown in FIG. 14. The number of the steps may be varied as appropriate and may be two, three, or the like.

Figure 15:
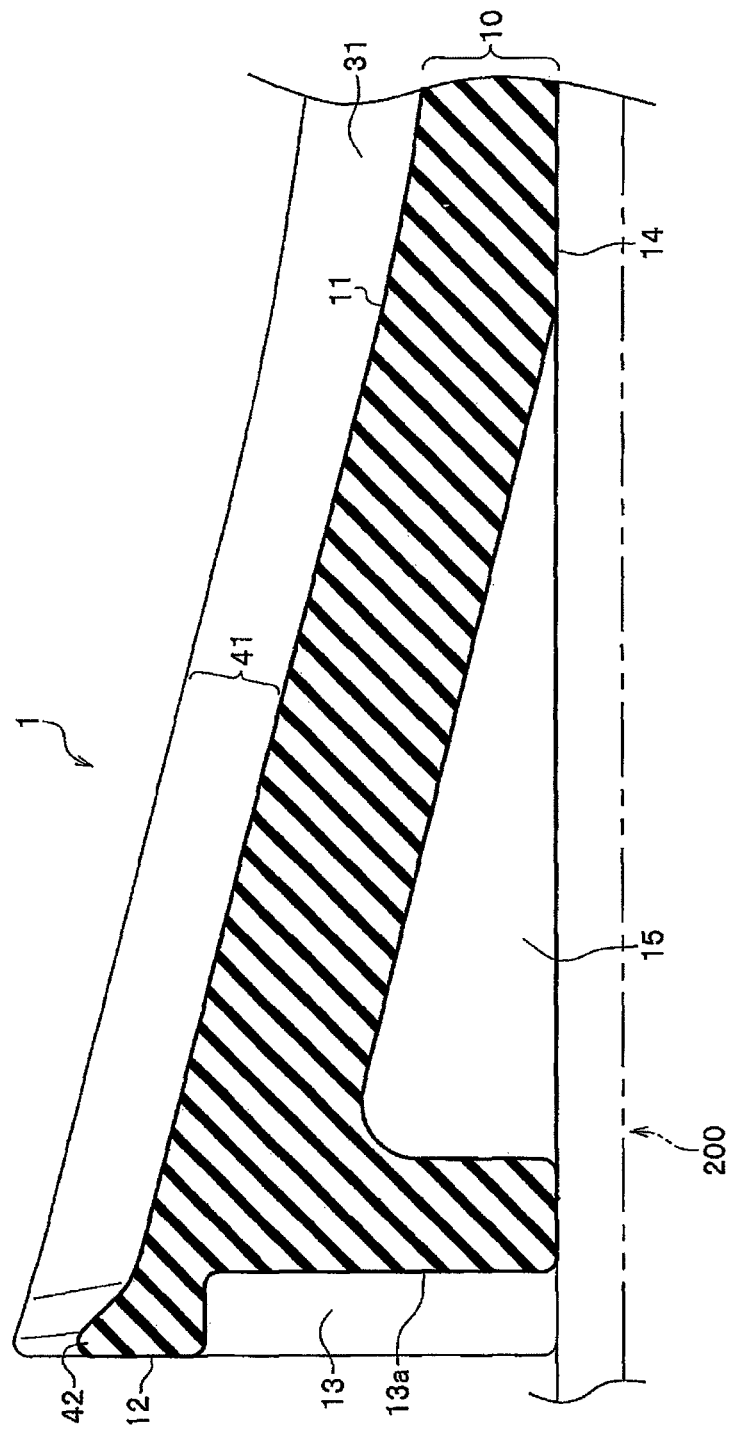
FIG. 15 is a cross-sectional view of a rubber sheet according to a variation, corresponding to a cross section taken along line X1-X1 in FIG. 4.

In the above-described embodiment, the configuration has been illustrated in which the entry side end surface 12 of the rubber sheet 1 is inclined (toward the entry side) so as to recess the spring bearing 200 side of the rubber sheet 1 as shown in FIG. 7. Alternatively, for example, the entry side end surface 12 may extend in the up-down direction instead of being inclined, as shown in FIG. 15.

Figure 16:
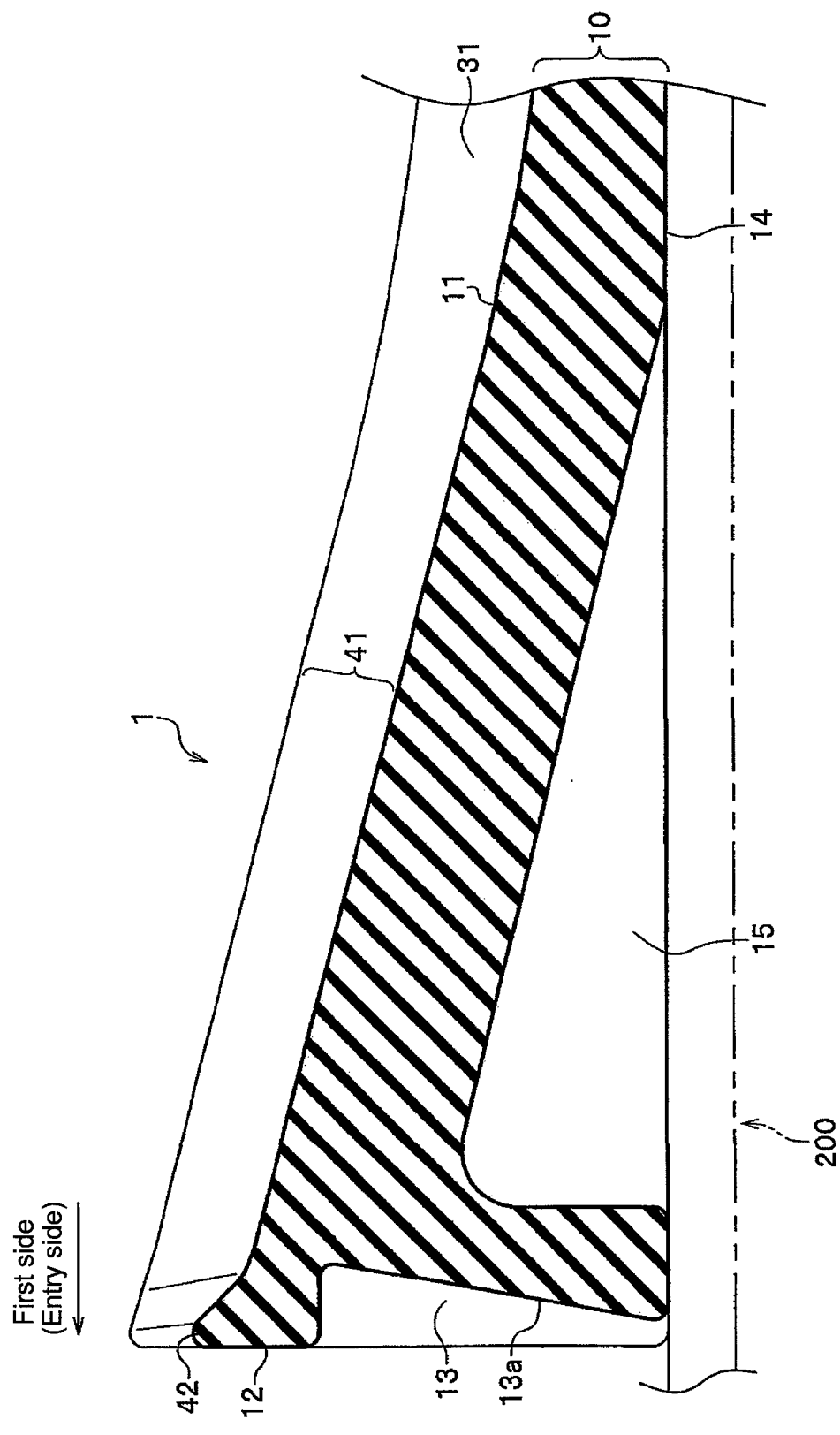
FIG. 16 is a cross-sectional view of a rubber sheet according to a variation, corresponding to a cross section taken along line X1-X1 in FIG. 4.

In this case, the bottom surface 13a of the entry side recess portion 13 may extend in the up-down direction (see FIG. 15) or a lower side of the bottom surface 13a may be inclined toward the first side with the depth of the entry side recess portion 13 gradually increasing upward as shown in FIG. 16.

In the above-described embodiment, the configuration has been illustrated which includes in the circumferential direction the two slip-off prevention portions (the first slip-off prevention portion 50 and the second slip-off prevention portion 60). However, for example, the number of the slip-off prevention portions may be changed to one or three or more.

In the above-described embodiment, the configuration has been illustrated in which the rubber sheet 1 includes the slope-like thick portion 16 with the thickness thereof gradually increasing on the other end thereof. Alternatively, for example, the thick portion may be generally constant in thickness instead of being sloped.

In the above-described embodiment, the configuration has been illustrated in which the piston rod 420 projects upward from the damper case 410 (see FIG. 1). However, for example, a configuration turned upside down may be adopted, that is, the piston rod 420 may project downward from the damper case 410.

The relative-magnitude relations between the radius R101 of the wire 101 and the radius of curvature R21 of the first inner side surface 21 and the radius of curvature R31 of the second inner side surface 31 are also not limited to the above-described embodiment but may be freely varied. For example, the radius of curvature R21 of the first inner side surface 21 and the radius of curvature R31 of the second inner side surface 31 may be made further smaller than the radius R101 of the wire 101 to further reduce the gap between the rubber sheet 1 and the wire 101.

In the above-described embodiment, the first collapsing margin 24 and the second collapsing margin 34 can be collapsed by a specific amount. However, the collapsing amount is not particularly limited and may be increased or reduced. An increased collapsing amount allows the first sidewall portion 20 and/or the second sidewall portion 30 to more firmly tighten the wire 101 of the coil spring 100 to bring the rubber sheet 1 and the wire 101 into tighter contact with each other.

In the above-described embodiment, a total of two collapsing margins are provided in the circumferential direction: one for the first sidewall portion 20 and the other for the second sidewall portion 30. However, the number of the collapsing margins may be one or three or more. Furthermore, the collapsing amount for the collapsing margins need not be constant but may be varied between the collapsing margins. Furthermore, the shape of the collapsing margin may be varied between the collapsing margins, and for example, may be conformed to the shape of the spring bearing 200.

In the above-described embodiment, the configuration has been illustrated in which the suspension apparatus 300 is of the strut type (see FIG. 1). Alternatively, for example, the suspension apparatus 300 may be of a wishbone type.

In the above-described embodiment, the configuration has been illustrated in which the coil spring 100 is installed outside the hydraulic shock absorber 400 (see FIG. 1).

Alternatively, for example, the coil spring 100 may be disposed in parallel with the hydraulic shock absorber 400.

Second Embodiment

Figure 18:
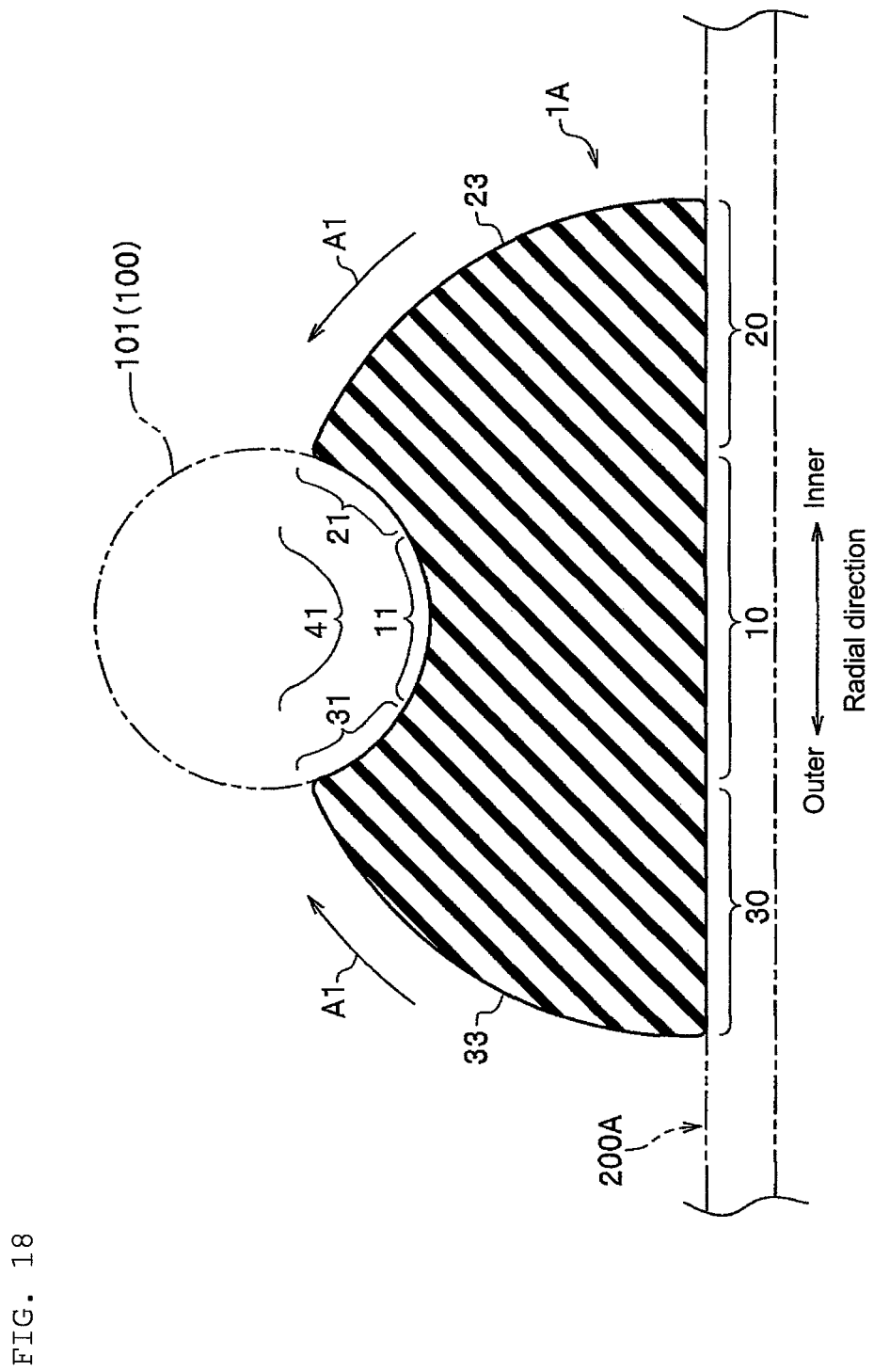
FIG. 18 is a cross-sectional view of the rubber sheet according to a second embodiment, corresponding to a cross section taken along line X3-X3 in FIG. 4.
Figure 19:
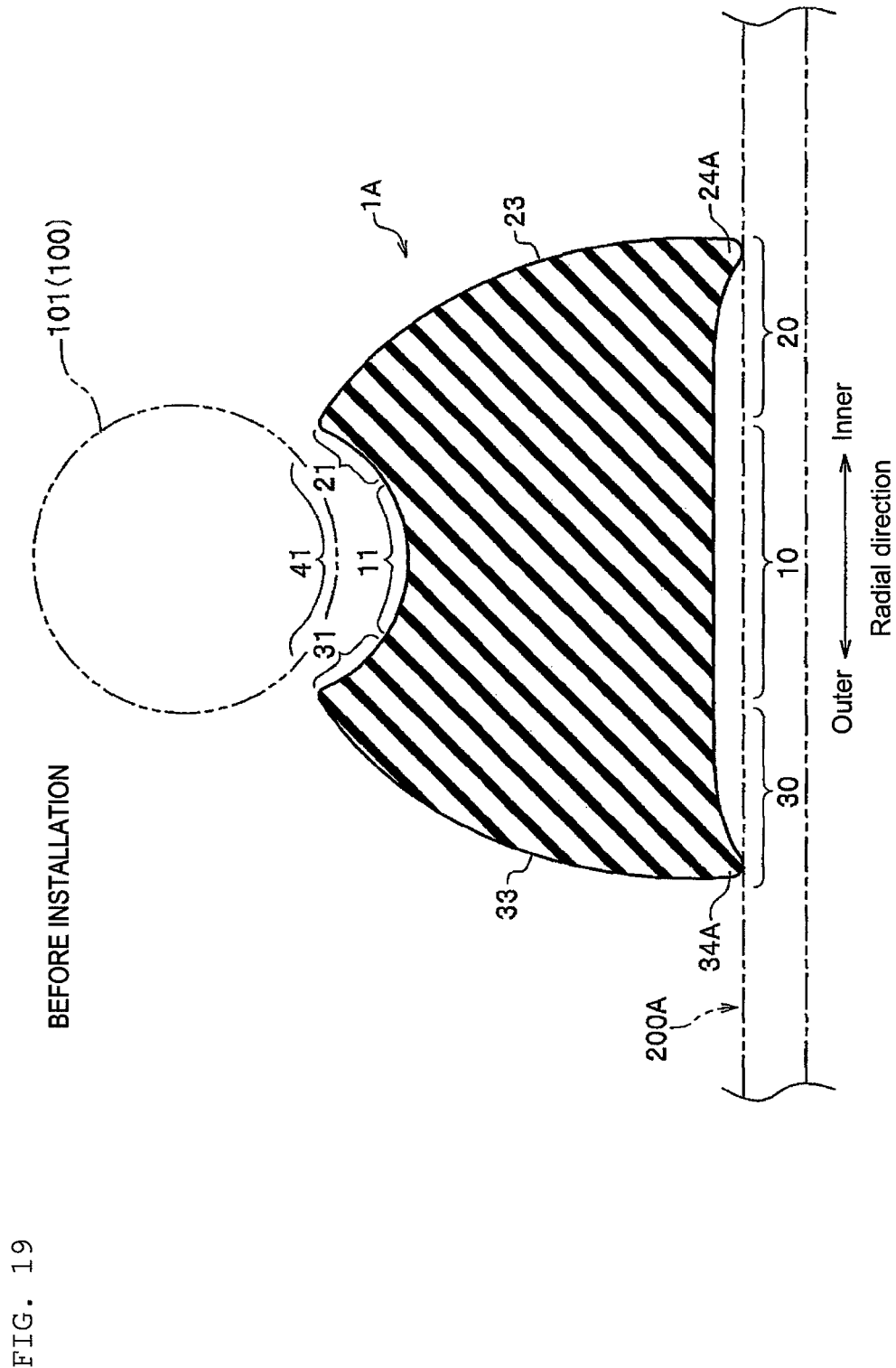
FIG. 19 is a cross-sectional view of the rubber sheet according to the second embodiment not installed on a spring bearing yet, corresponding to a cross section taken along line X3-X3 in FIG. 4.

A second embodiment of the present invention will be described with reference to FIG. 18 and FIG. 19. Differences from the first embodiment will be described.

A rubber sheet 1A according to a second embodiment is configured not to be fitted into the groove 210 (see FIG. 9) of the spring bearing 200 but to be disposed on a spring bearing 200A.

A first collapsing margin 24A and a second collapsing margin 34A according to the second embodiment are leg portions positioned at the respective opposite ends of the rubber sheet 1A which contact the spring bearing 200A and partly projecting toward a side of the spring bearing 200A located below the rubber sheet 1A. Furthermore, in a radial cross section, the rubber sheet 1A includes a space between the rubber sheet 1A and the spring bearing 200A and between the first collapsing margin 24A and the second collapsing margin 34A (of the rubber sheet 1A). These arrangements allow a load input from the wire 101 (coil spring 100) to the seating portion 10 of the rubber sheet 1A to be positively utilized and enables the first sidewall portion 20 and the second sidewall portion 30 of the rubber sheet 1A to generate a tightening force when the first collapsing margin 24 and the second collapsing margin 34 collapse with respect to the spring bearing 200A (see arrow A1 in FIG. 18).

According to the second embodiment, the first sidewall portion 20 and the second sidewall portion 30 tighten the wire 101 (arrow A1 in FIG. 18) to tightly contact the wire 101 as is the case with the first embodiment. This prevents a gap from being formed between the wire 101 and each of the first sidewall portion 20 and the second sidewall portion 30. Thus, mud, sand, or the like is unlikely to flow in between the wire 101 and each of the first sidewall portion 20 and the second sidewall portion 30, allowing the coil spring 100 to be prevented from, for example, having its coating chipped or being broken.

Third Embodiment

Figure 20:
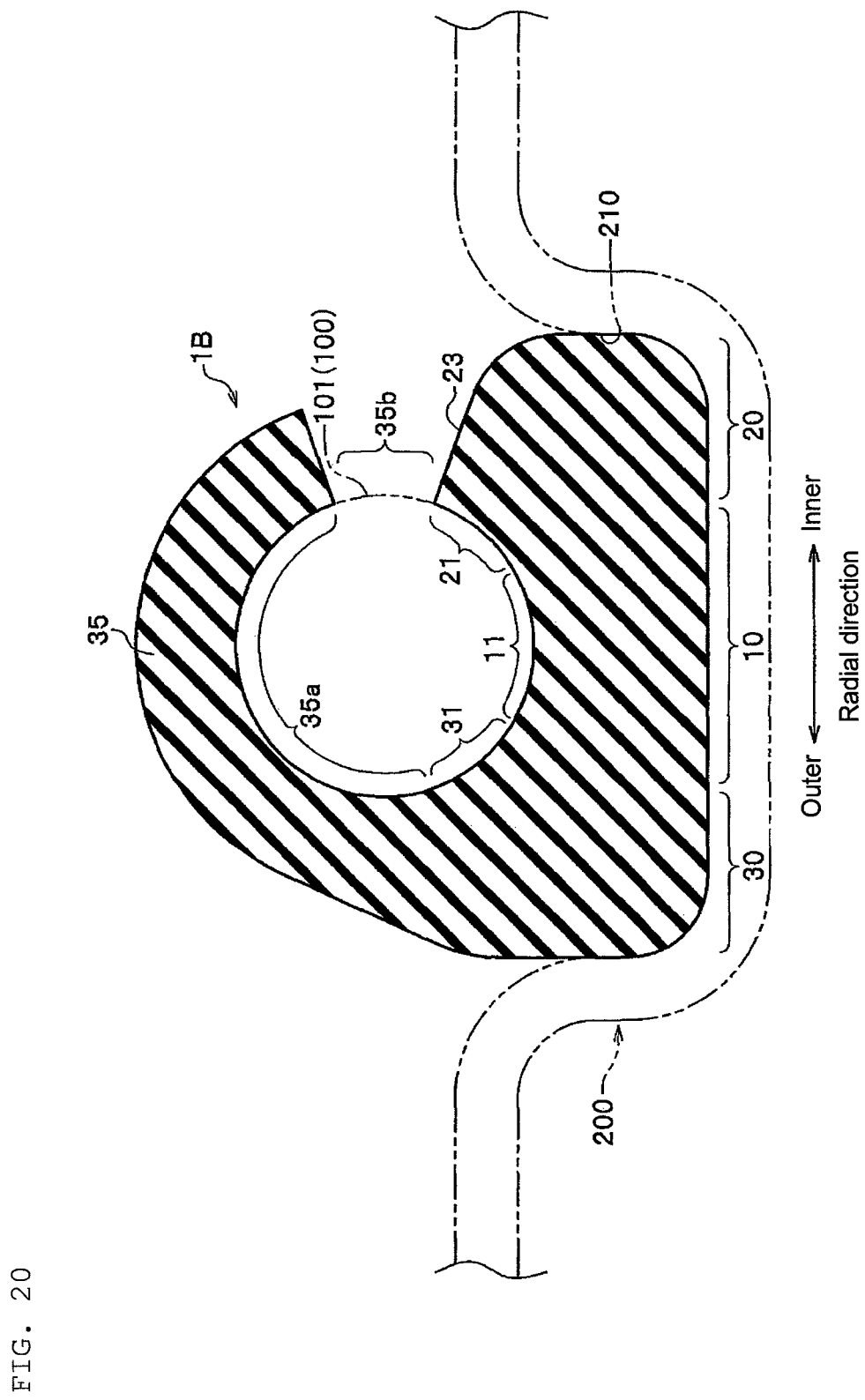
FIG. 20 is a cross-sectional view of the rubber sheet according to a third embodiment, corresponding to a cross section taken along line X3-X3 in FIG. 4.
Figure 21:
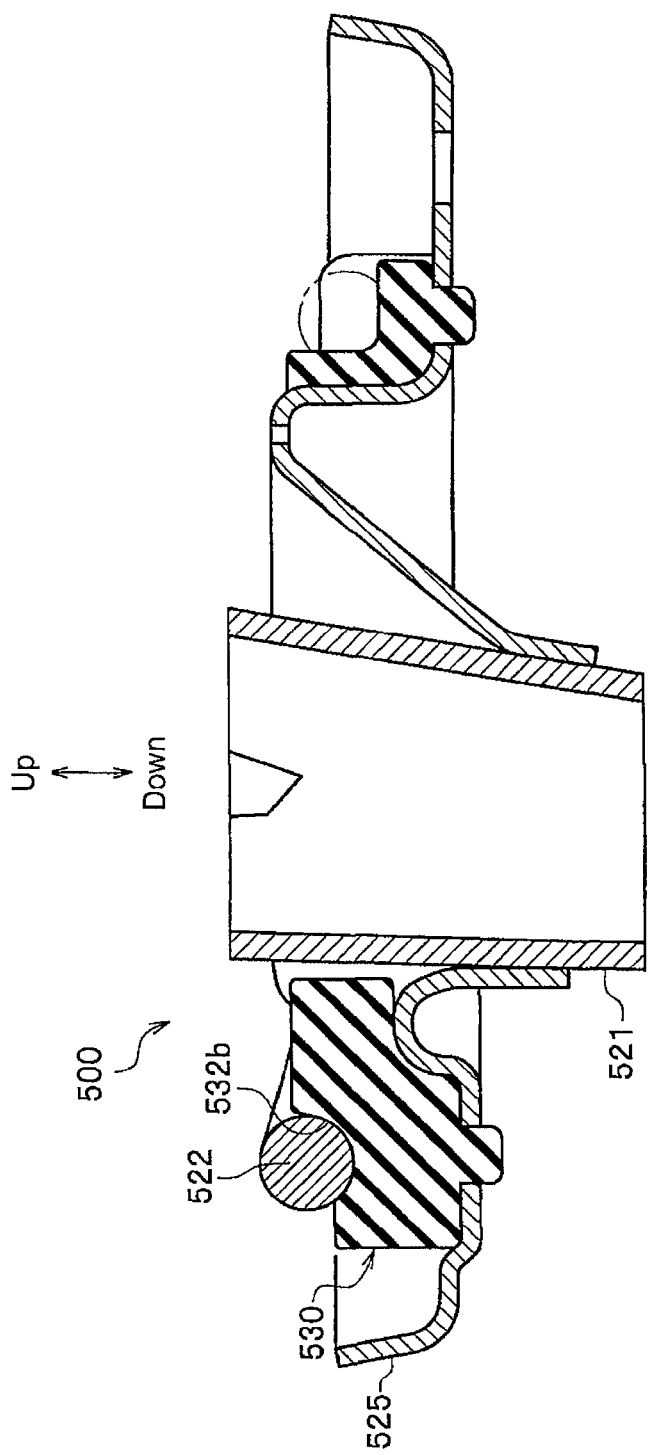
FIG. 21 is a vertical cross-sectional view of a suspension apparatus according to a conventional technique.

A third embodiment of the present invention will be described with reference to FIG. 20. Differences from the first embodiment will be described.

A rubber sheet 1B according to a third embodiment is what is called a cylindrical rubber sheet and includes an upper wall portion 35 extending radially inward from above the second sidewall portion 30 along the upper surface of the wire 101. An opening 35b serving as an insertion port for the wire 101 is formed between a radially inner leading end of the upper wall portion 35 and the first upper surface 23 of the first sidewall portion 20. The upper wall portion 35 extends all along the circumference of the rubber sheet 1B and includes an inner surface 35a that tightens the wire 101 by means of the elastic force of the upper wall portion 35.

According to the third embodiment, the first sidewall portion 20 and the second sidewall portion 30 tighten the wire 101 to tightly contact the wire 101 as is the case with the first embodiment. This prevents a gap from being formed between the wire 101 and each of the first sidewall portion 20 and the second sidewall portion 30. Thus, mud, sand, or the like is unlikely to flow in between the wire 101 and each of the first sidewall portion 20 and the second sidewall portion 30, allowing the coil spring 100 to be prevented from, for example, having its coating chipped or being broken.

The upper wall portion 35 of the rubber sheet 1B is shaped like a cylinder covering the upper surface of the wire 101. This allows sand, mud, or the like to be further prevented from flowing in between the wire 101 and the rubber sheet 1B.

According to the third embodiment, the opening 35b is located at a radially inward position. However, the opening 35b may be located at another position. Furthermore, according to the third embodiment, the upper wall portion 35 extends upward from the second sidewall portion 30. Alternatively, the upper wall portion 35 may extend upward from the first sidewall portion 20.

The third embodiment has been illustrated as a variation of the first embodiment. However, the third embodiment is not limited to this. A cylindrical base may be configured based on the rubber sheet 1A according to the second embodiment.

The first to third embodiments use the rubber sheet 1 as an elastic sheet. However, the invention is not limited to the rubber sheet 1. The elastic sheet may be formed of resin or the like, that is, any substance (material) that reduces a load input by the coil spring 100.

<Variation of the Spring Bearing Side Recess Portion>

The above-described embodiments illustrate that the spring bearing side recess portion 15 with a radial cross section shaped like a rectangle (see FIG. 8) or a semi-circle (not shown in the drawings) or shaped such that the size of the spring bearing side recess portion 15 increases upward relative to the opening width (see FIG. 17). However, the spring bearing side recess portion 15 is not limited to these shapes.

Figure 22:
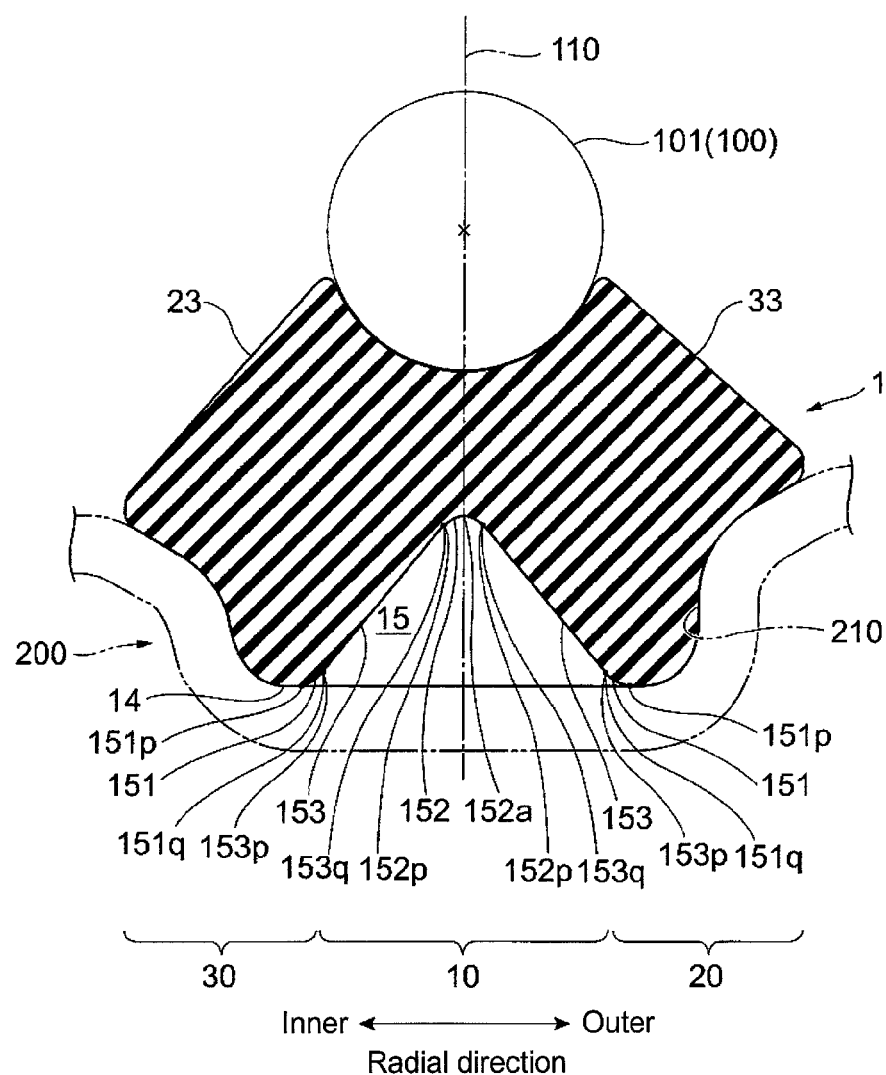
FIG. 22 is a drawing showing a radial cross section of a spring bearing side recess portion according to a first variation.

FIG. 22 is a drawing showing a radial cross section of a spring bearing side recess portion 15 according to a first variation. FIG. 22 is also a cross-sectional view of a portion X2-X2 in FIG. 4.

In the rubber sheet 1 with the spring bearing side recess portion 15 according to the first variation formed therein, the spring bearing side recess portion 15 (a second recess portion according to the present invention) is formed to prevent an area (according to the first variation, a top portion 152a described below) of the seating portion 10 located immediately below the wire 101 forming the coil spring 100 from coming into contact with the spring bearing 200 when the coil spring 100 is compressed. Specifically, an example is illustrated in which the spring bearing side recess portion 15 according to the first variation appears in radial section to have an approximately triangular shape as shown in FIG. 22. That is, in the rubber sheet 1 with the spring bearing side recess portion 15 according to the first variation formed therein, the spring bearing side recess portion 15 is shaped like a triangle with a vertex corresponding to the area (top portion 152a described below) of the seating portion 10 located immediately below the wire 101 forming the coil spring 100. Thus, the spring bearing side recess portion 15 according to the first variation is defined by edge portions 151 located at edges of the opening at the spring bearing 200 side, a bottom portion 152 that is the deepest portion of the recess, and side portions 153 each located between the corresponding edge portion 151 and the bottom portion 152.

The edge portions 151 are areas formed at a radially inner edge and a radially outer edge, respectively, of the opening at the spring bearing 200 side and appearing like circular arcs in radial section. As shown in the radial cross-sectional view in FIG. 22, a first end portion 151p of the circular arc of the edge portion 151 is connected to the back surface 14, placed on the bottom surface of the groove 210 of the spring bearing 200, and a second end portion 151q of the circular arc of the edge portion 151 is connected to a first end portion 153p, described below, of the side portion 153.

The bottom portion 152 appears in radial section to have a circular arc shape with a top portion 152a on a line which passes through the center of the wire 101 of the coil spring 100 supported by the rubber sheet 1 and which extends perpendicularly to the bottom surface of the groove 210 of the spring bearing 200. As shown in the radial cross-sectional view in FIG. 22, the bottom portion 152 has opposite ends 152p of the circular arc and the opposite ends 152p are connected to respective second end portions 153q, described below, of the side portions 153. The line which passes through the center of the wire 101 of the coil spring 100 supported by the rubber sheet 1 and which extends perpendicularly to the bottom surface of the groove 210 of the spring bearing 200 is hereinafter sometimes referred to as a "center line". And, reference numeral 110 is used to indicate this center line.

The side portion 153 is an area appearing in the radial cross-sectional view shown in FIG. 22 to have a linear shape connecting the second end portion 153q of the edge portion 151 to the end portion 152p of the bottom portion 152. The side portion 153 according to the first variation is inclined with respect to the bottom surface of the groove 210 of the spring bearing 200. In other words, the side portion 153 according to the first variation is inclined with respect to the center line 110.

Since the spring bearing side recess portion 15 is shaped approximately like a triangle defined by the edge portions 151, the bottom portion 152 and the side portions 153, an area of the seating portion 10 located opposite the bottom surface of the groove 210 of the spring bearing 200 is shaped approximately like a triangle defined by the bottom portion 152 and the side portions 153. Additionally, a surface of the seating portion 10 located closer to the bottom surface of the groove 210 appears in the radial cross-sectional view shown in FIG. 22 to have an approximately equilateral triangle with a vertex corresponding to the top portion 152a of the bottom portion 152 and with sides corresponding to the two side portions 153.

In the spring bearing side recess portion 15 according to the first variation, the bottom portion 152 is shaped like a circular arc. However, the bottom portion 152 is not particularly limited to this shape. The bottom portion 152 may have a flat shape parallel to the groove 210 or a pointed shape (the corresponding corner portion may not be rounded into a circular arc, differently from the case of the first variation). Furthermore, each of the two side portions 153 may be extended to the center line 110 and the circular-arc bottom portion 152 may be omitted. In the case of such a shape, the intersection point between the side portion 153 and the center line 110 is defined as the top portion 152a.

The edge portion 151 is also shaped like a circular arc but is not limited to this shape. The edge portion 151 may have a linear shape perpendicular to the groove 210 or a pointed shape (the corresponding corner portion may not be rounded into a circular arc, differently from the case of the first variation).

In the illustrated first variation, the top portion 152a is located on the center line 110. However, the top portion 152a is not limited to this position. The top portion 152a may appear in radial section to lie to the right of the center line 110 or to the left of the center line 110. Even in this case, the top portion 152a corresponds to the "area located immediately below the wire" according to the present invention.

Figure 23:
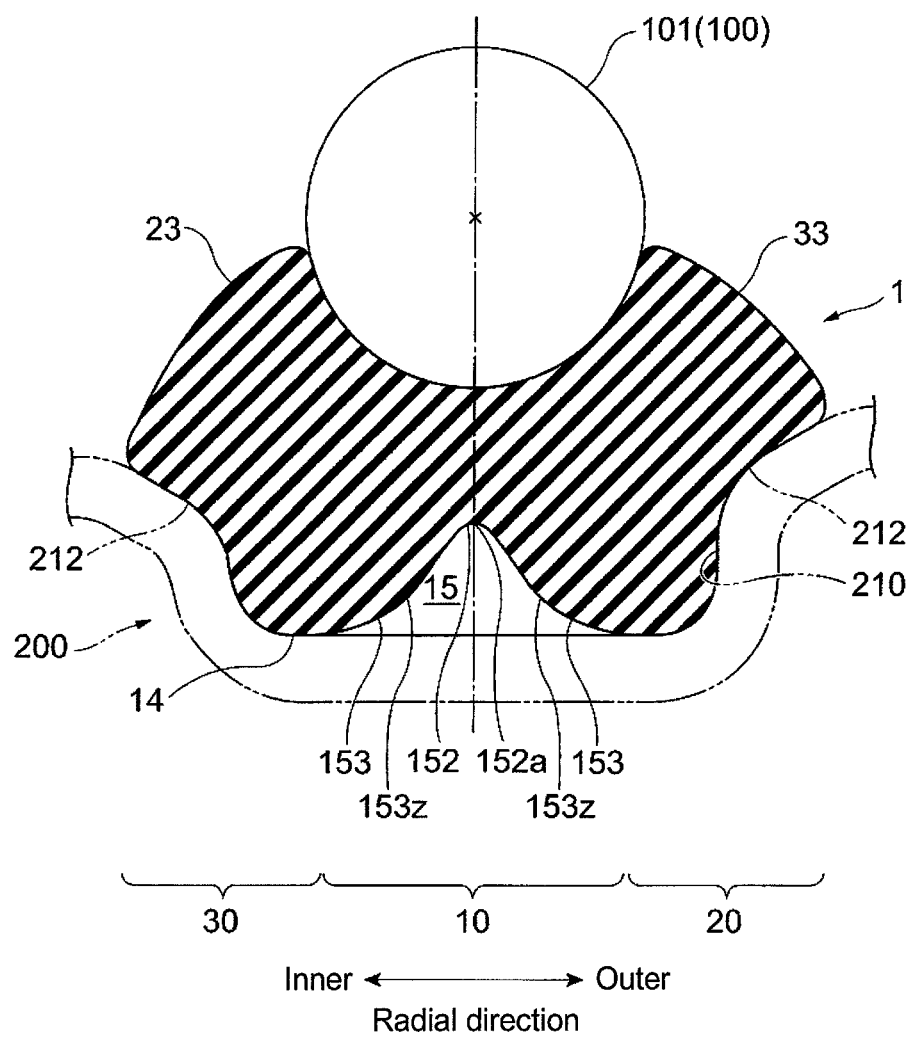
FIG. 23 is a drawing showing the state of the rubber sheet observed when the coil spring supported by the rubber sheet with the spring bearing side recess portion according to the first variation formed therein is compressed to apply a compressive load to the rubber sheet.

FIG. 23 is a drawing showing the state of the rubber sheet 1 observed when the coil spring 100 supported by the rubber sheet 1 with the spring bearing side recess portion 15 according to the first variation formed therein is compressed to apply a compressive load to the rubber sheet 1.

In the rubber sheet 1 with the spring bearing side recess portion 15 according to the first variation formed therein, when the coil spring 100 is compressed to apply a compressive load to the rubber sheet 1, a force directed downward from the center of the wire 101 of the coil spring 100 (toward the bottom surface of the groove 210 of the spring bearing 200) acts on the seating portion 10. Then, the first sidewall portion 20 and the second sidewall portion 30 receive a reaction force from the bottom surface of the groove 210 of the spring bearing 200. As a result, a force from the bottom portion 152 side and a force from the edge portion 151 side act on the side portion 153 of the spring bearing side recess portion 15. That is, the side portion 153 is compressed from the opposite end portions thereof. On the other hand, the first collapsing margin 24 (see FIG. 10), the second collapsing margin 34 (see FIG. 10), and the first sidewall portion 20 and the second sidewall portion 30 receive the reaction force from the spring bearing 200, and thus, a force directed from a widthwise outer side toward a central side acts on the seating portion 10. Thus, as shown in FIG. 23, central portions 153z of the side portions 153, shaping a surface of the seating portion 10 located closer to the bottom surface of the groove 210, are deformed so as to protrude toward the bottom surface of the groove 210 (in other words, toward the center line 110 of the groove 210). As shown in FIG. 23, the bottom portion 152 moves toward the bottom surface of the groove 210 of the spring bearing 200 but the central portions of the side portions 153 are deformed so as to protrude, thus preventing the bottom portion 152 from coming into contact with the bottom surface of the groove 210 of the spring bearing 200. Thus, in the spring bearing side recess portion 15 according to the first variation, the top portion 152a located immediately below the center of the wire 101 forming the coil spring 100 is prevented from coming into contact with the spring bearing 200 when the coil spring 100 is compressed.

Hence, if sand or the like enters the spring bearing side recess portion 15 of the rubber sheet 1 over the bottom surface of the groove 210 of the spring bearing 200, the top portion 152a of the bottom portion 152 is restrained from coming into contact with the sand or the like on the bottom surface of the groove 210. This suppresses a situation in which the top portion 152a of the bottom portion 152 comes into contact with the sand or the like and is damaged and in which the coil spring 100 subsequently repeats compression and extension to develop a crack starting from the damaged top portion 152a of the bottom portion 152 into the rubber sheet 1, which is thus broken.

The spring bearing side recess portion 15 according to the first variation is approximately shaped like an equilateral triangle. However, the length of the side portion 153, the angle between the side portion 153 and the center line 110, the positions of the first end portion 153p and second end portion 153q of the side portion 153, and the like need not necessarily be as described above provided that the length, the angle, the position, and the like meet the need to be able to restrain the top portion 152a of the seating portion 10 from coming into contact with the bottom surface of the groove 210. For example, the length of the side portion 153 may be changed so as to shape the spring bearing side recess portion 15 into an approximately isosceles triangle.

Now, a second variation is illustrated as another variation.

In the second variation, in the rubber sheet 1 with the spring bearing side recess portion 15 formed therein, in a case where the coil spring 100 is compressed, the spring bearing side recess portion 15 (the second recess portion according to the present invention) is formed to prevent the area (in the second variation, the top portion 152*a* described below) of the seating portion 10 located immediately below the wire 101 forming the coil spring 100 from coming into contact with the spring bearing 200, as is the case of the first variation.

Figure 24:
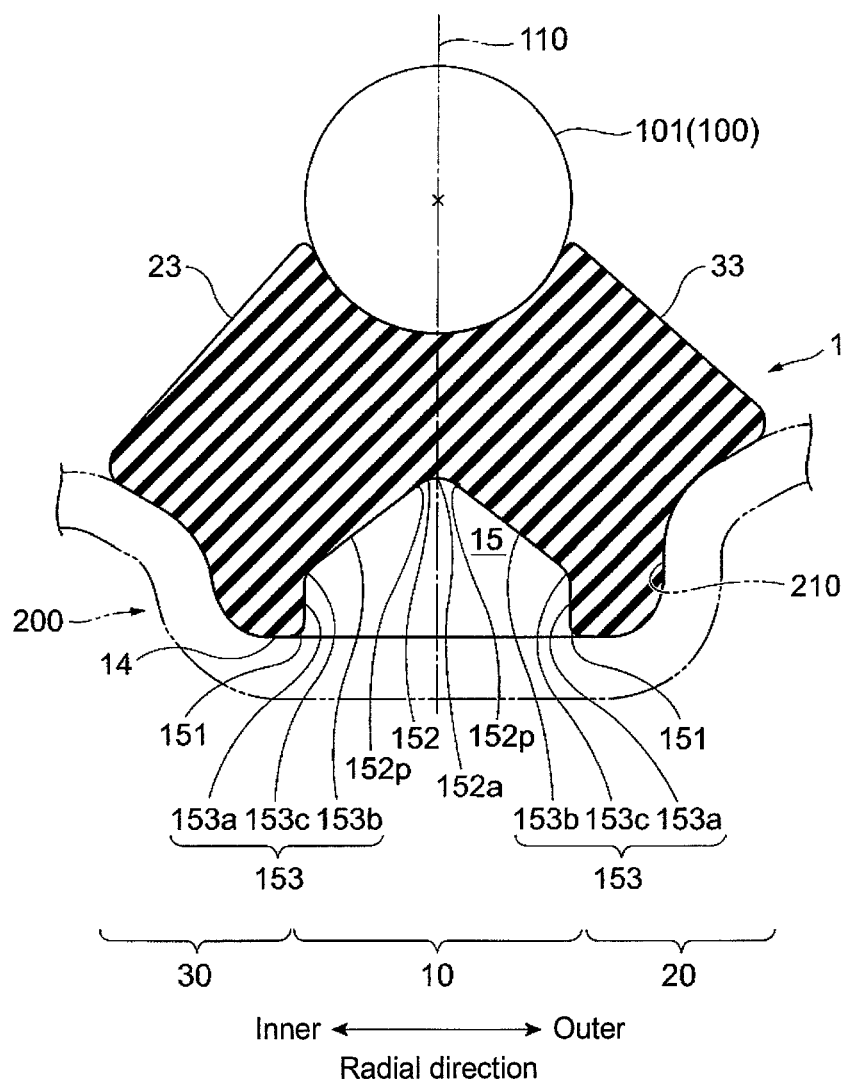
FIG. 24 is a drawing showing a radial cross section of a spring bearing side recess portion according to a second variation.

FIG. 24 is a drawing showing a radial cross section of the spring bearing side recess portion 15 according to the second variation. FIG. 24 is also a cross-sectional view of the portion X2-X2 in FIG. 4.

The spring bearing side recess portion 15 according to the second variation is characterized by appearing in radial section to have an approximately pentagonal shape as shown in FIG. 24. That is, the spring bearing side recess portion 15 according to the second variation is different from the spring bearing side recess portion 15 according to the first variation in that the side portion 153 is bent. Specifically, the side portion 153 of the spring bearing side recess portion 15 according to the second variation has an upward portion 153*a* extending upward from the edge portion 151 in the direction of the center line of the coil spring 100 and an inclined portion 153*b* extending from the end portion 152*p* of the bottom portion 152 in a direction in which the inclined portion 153*b* is inclined with respect to the center line 110 of the coil spring 100. The side portion 153 also has a circular arc portion 153*c* connecting the upward portion 153*a* and the inclined portion 153*b* together. Additionally, in the rubber sheet 1 with the spring bearing side recess portion 15 according to the second variation formed therein, the surface of the seating portion 10 located closer to the bottom surface of the groove 210 appears, in the radial cross-sectional view shown in FIG. 24, to have an approximately pentagonal shape with a vertex corresponding to the top portion 152*a* of the bottom portion 152.

In the spring bearing side recess portion 15 according to the second variation, the bottom portion 152 is shaped like a circular arc. However, the bottom portion 152 is not particularly limited to this shape. The bottom portion 152 may have a flat shape parallel to the groove 210 or a pointed shape (the corresponding corner portion may not be rounded into a circular arc, differently from the case of the second variation). Furthermore, each of the inclined portions 153*b* of the two side portions 153 may be extended to the center line 110, and the circular-arc bottom portion 152 may be omitted. In the case of such a shape, the intersection point between the inclined portion 153*b* of the side portion 153 and the center line 110 is defined as the top portion 152*a*.

In the illustrated second variation, the top portion 152*a* is located on the center line 110. However, the top portion 152*a* is not limited to this position. The top portion 152*a* may appear in radial section to lie to the right of the center line 110 or to the left of the center line 110. Even in this case, the top portion 152*a* corresponds to the "area located immediately below the wire" according to the present invention.

Figure 25:
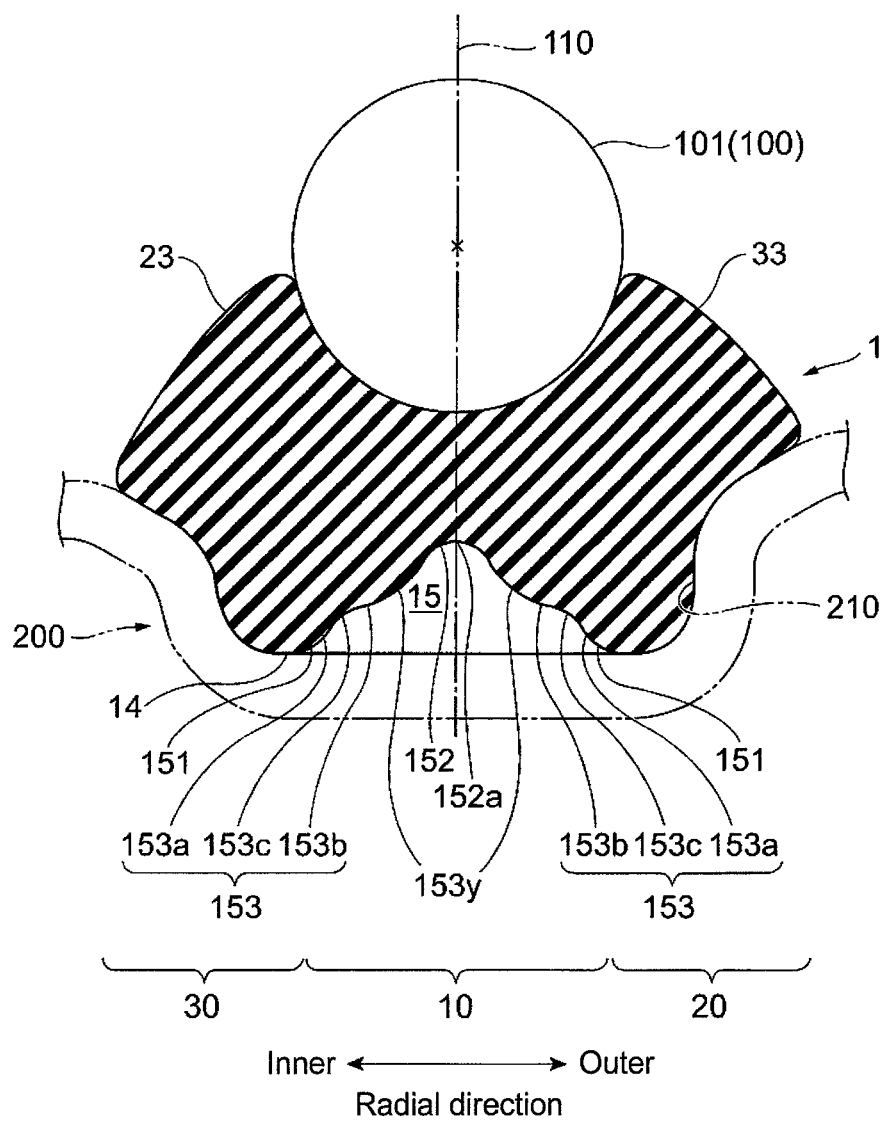
FIG. 25 is a drawing showing the state of the rubber sheet observed when the coil spring supported by the rubber sheet with the spring bearing side recess portion according to the second variation formed therein is compressed to apply a compressive load to the rubber sheet.

FIG. 25 is a drawing showing the state of the rubber sheet 1 observed when the coil spring 100 supported by the rubber sheet 1 with the spring bearing side recess portion 15 according to the second variation formed therein is compressed to apply a compressive load to the rubber sheet 1.

In the rubber sheet 1 with the spring bearing side recess portion 15 according to the second variation configured as described above, when the coil spring 100 is compressed to apply a compressive load to the rubber sheet 1, central portions 153*y* of the inclined portions 153*b*, shaping the surface of the seating portion 10 located closer to the bottom surface of the groove 210, are deformed so as to protrude toward the bottom surface of the groove 210 of the spring bearing 200, as is the case with the rubber sheet 1 with the spring bearing side recess portion 15 according to the first variation. Then, the top portion 152*a* of the bottom portion 152 moves toward the bottom surface of the groove 210 of the spring bearing 200 but the inclined portions 153*b* are deformed so as to protrude, thus preventing the top portion 152*a* from coming into contact with the bottom surface of the groove 210 of the spring bearing 200. That is, in the spring bearing side recess portion 15 according to the second variation, the top portion 152*a* located immediately below the center of the wire 101 forming the coil spring 100 is prevented from coming into contact with the spring bearing 200 when the coil spring 100 is compressed. In other words, the spring bearing side recess portion 15 is formed to prevent the area (top portion 152*a*) of the seating portion 10 located immediately below the center of the wire 101 forming the coil spring 100 from coming into contact with the spring bearing 200 when the coil spring 100 is compressed. Hence, if sand or the like enters the spring bearing side recess portion 15 over the bottom surface of the groove 210 of the spring bearing 200, the top portion 152*a* of the bottom portion 152 is restrained from coming into contact with the sand or the like on the bottom surface of the groove 210. This suppresses possible breakage of the rubber sheet 1.

As described above, in the rubber sheet 1 with the spring bearing side recess portion 15 according to the second variation formed therein, the spring bearing side recess portion 15 is shaped approximately like a pentagon with a vertex corresponding to the area (top portion 152*a*) of the seating portion 10 located immediately below the center of the wire 101 forming the coil spring 100. The spring bearing side recess portion 15 according to the second variation is approximately shaped like a pentagon. However, the shape of the spring bearing side recess portion 15 is not particularly limited provided that the shape meets the need to be able to restrain the top portion 152*a* of the seating portion 10 from coming into contact with the bottom surface of the groove 210. For example, the spring bearing side recess portion 15 may appear in radial section to have an approximate rectangular shape in which the bottom portion 152 has a linear shape parallel to the bottom surface of the groove 210 of the spring bearing 200 and in which the side portion 153 has a linear shape parallel to the direction of the center line 110, with the direction of the center line 110 being a longitudinal direction. Alternatively, in contrast to the approximately rectangular shape, the bottom portion 152 may be shaped like a circular arc instead of having a linear shape. That is, the bottom portion 152 may be shaped like a semi-circle with a diameter corresponding to the distance between the two side portions 153 parallel to the direction of the center line 110, and the opposite ends of the bottom portion 152 are connected to the respective ends of the side portions 153.

Furthermore, the edge portion 151 is also shaped like a circular arc but is not limited to this shape. The edge portion 151 may have a linear shape perpendicular to the groove 210 or have a pointed shape (the corresponding corner portion may not be rounded into a circular arc, differently from the case of the second variation).

Figure 26:
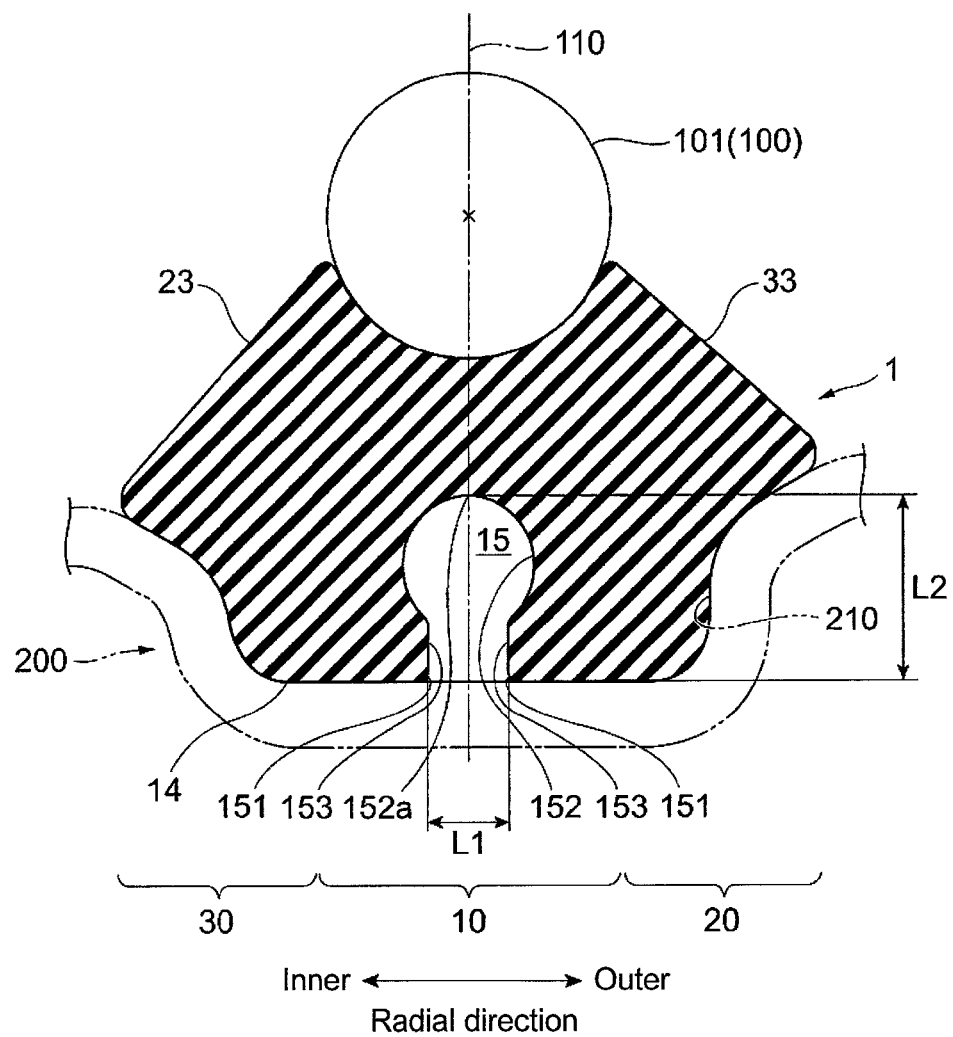
FIG. 26 is a drawing showing a radial cross section of a spring bearing side recess portion according to a third variation.

FIG. 26 is a drawing showing a radial cross section of the spring bearing side recess portion 15 according to a third variation. FIG. 26 is also a cross-sectional view of the portion X2-X2 in FIG. 4.

The spring bearing side recess portion 15 according to the third variation is characterized by appearing in radial section to have an approximate keyhole shape as shown in FIG. 26. That is, as shown in FIG. 26, the bottom portion 152 of the spring bearing side recess portion 15 according to the third variation appears in radial section to have a circular arc that is open at a side of the bottom portion 152 located closer to the bottom surface of the groove 210 of the spring bearing 200. Furthermore, the side portion 153 of the spring bearing side recess portion 15 according to the third variation extends upward from the edge portion 151 in the direction of the center line 110. The distance between the radially inward side portion 153 and the radially outer side portion 153 is smaller than the diameter of the bottom portion 152. The distance L1 between the radially inner side portion 153 and the radially outer side portion 153 is shorter than a distance L2 from the bottom surface of the groove 210 of the spring bearing 200 to the top portion 152a of the bottom portion 152. Thus, the surface of the seating portion 10 located closer to the bottom surface of the groove 210 appears in the radial cross-sectional view shown in FIG. 26 to have an approximate keyhole shape in which the top portion 152a of the bottom portion 152 corresponds to the deepest portion.

In the third variation, the distance L1 between the radially inner side portion 153 and the radially outer side portion 153 is shorter than the distance L2 from the bottom surface of the groove 210 of the spring bearing 200 to the top portion 152a of the bottom portion 152. However, the third variation is not limited to this. The distance L1 may be shorter than or equivalent to the distance L2.

Furthermore, in the spring bearing side recess portion 15 according to the third variation, the circular arc is approximately three-fourths of the circle but is not limited to this shape. In short, another circular arc may be adopted provided that the shape meets the need to be able to restrain the top portion 152a of the spring bearing side recess portion 15 from coming into contact with the bottom surface of the groove 210, as described below. Similarly, the side portion 153 may have another shape, provided that the shape, in view of the shape of the surrounding portion such as the groove 210 of the spring bearing 200, meets the need to be able to restrain the top portion 152a of the spring bearing side recess portion 15 from coming into contact with the bottom surface of the groove 210.

In the rubber sheet 1 with the spring bearing side recess portion 15 according to the third variation configured as described above, when the coil spring 100 is compressed to apply a compressive load to the rubber sheet 1, a force from the bottom portion 152 acts on an upper end portion of the side portion 153 and a force from the edge portion 151 act on a lower end portion of the side portion 153, and the compression force is exerted on the side portion 153 from the end portions. On the other hand, the first collapsing margin 24 (see FIG. 10), the second collapsing margin 34 (see FIG. 10), and the first sidewall portion 20 and the second sidewall portion 30 receive the reaction force from the spring bearing 200, and thus, a force directed from a widthwise outer side toward a central side acts on the side portion 153. Thus, the side portions 153 are deformed so as to protrude toward the central side and toward the bottom surface of the groove 210 of the spring bearing 200, reducing the distance between the radially inner side portion 153 and the radially outer side portion 153. Furthermore, also before the compressive load acts on the rubber sheet 1, the distance between the radially inner side portion 153 and the radially outer side portion 153 is shorter than the diameter of the bottom portion 152. Hence, even when the bottom portion 152 moves toward the bottom surface side of the groove 210 of the spring bearing 200, since the distance between the radially inner side portion 153 and the radially outer side portion 153 is short, the bottom portion 152 is prevented from passing beyond this area and coming into contact with the bottom surface of the groove 210. That is, with regard to the spring bearing side recess portion 15 according to the third variation, the top portion 152a located immediately below the center of the wire 101 forming the coil spring 100 does not come into contact with the spring bearing 200 when the coil spring 100 is compressed. In other words, the spring bearing side recess portion 15 is formed such that the area (the top portion 152a) located immediately below the wire 101 forming the coil spring 100 does not come into contact with the spring bearing 200 when the coil spring 100 is compressed. Thus, if sand or the like enters the spring bearing side recess portion 15 of the rubber sheet 1 over the bottom surface of the groove 210 of the spring bearing 200, the top portion 152a of the bottom portion 152 is restrained from coming into contact with the sand and or the like on the bottom surface of the groove 210. This suppresses possible breakage of the rubber sheet 1.

What is claimed is:

1. An elastic sheet interposed between a coil spring that is provided in a suspension apparatus and that extends in an axial direction and a spring bearing that supports a lower end portion of the coil spring,
the elastic sheet comprising:
a seating portion at which the coil spring is seated and which has a circular arc shape in a view from the axial direction, one circumferential side of the seating portion being a side of entry of the coil spring; and
a pair of sidewall portions extending from respective width-wise opposite ends of the seating portion toward the coil spring side, wherein
at least one of the sidewall portions has a wire contact surface that contacts a wire forming the coil spring and an inclined surface that is inclined so as to approach the spring bearing as the inclined surface extends widthwise outward from the wire contact surface, and
a radius of the wire contact surface at least at an opening side is smaller than a radius of the wire, said opening side formed on the wire contact surface adjacent to the inclined surface and opening to an upward direction.

2. The elastic sheet according to claim 1, wherein a protruding portion protruding toward the wire is formed on the coil spring entry side of a groove surface which contacts the coil spring.

3. The elastic sheet according to claim 2, further comprising a collapsing margin that is formed at a side of the spring bearing and that, when collapsed, generates a tightening force that tightens one of the sidewall portions against the wire.

4. The elastic sheet according to claim 2, wherein a first recess portion is formed on an end surface of the seating portion at the side of entry of the coil spring.

5. The elastic sheet according to claim 2, wherein a second recess portion that is open toward a side of the spring bearing is formed on the seating portion at a side of the spring bearing.

6. The elastic sheet according to claim 1, further comprising a collapsing margin that is formed at a side of the spring bearing and that, when collapsed, generates a tightening force that tightens the sidewall portions against the wire.

7. The elastic sheet according to claim 6, wherein a first recess portion is formed on an end surface of the seating portion at the side of entry of the coil spring.

8. The elastic sheet according to claim 6, wherein a second recess portion that is open toward a side of the spring bearing is formed on the seating portion at a side of the spring bearing.

9. The elastic sheet according to claim 1, wherein a first recess portion is formed on an end surface of the seating portion at the side of entry of the coil spring.

10. The elastic sheet according to claim 9, wherein the end surface of the seating portion at the side of entry of the coil spring is oblique in such a manner that the end surface at a side of the spring bearing is recessed.

11. The elastic sheet according to claim 10, wherein a second recess portion that is open toward a side of the spring bearing is formed on the seating portion at a side of the spring bearing.

12. The elastic sheet according to claim 9, wherein a second recess portion that is open toward a side of the spring bearing is formed on the seating portion at a side of the spring bearing.

13. The elastic sheet according to claim 1, wherein a second recess portion that is open toward a side of the spring bearing is formed on the seating portion at a side of the spring bearing, and
the second recess portion is formed to have a triangle shape with a vertex corresponding to the area of the seating portion located immediately below the wire, which forms the coil spring.

14. A suspension apparatus comprising:
a hydraulic shock absorber installed on a vehicle body side and on a wheel side;
a coil spring;
a spring bearing supporting the coil spring; and
the elastic sheet according to claim 1 interposed between the coil spring and the spring bearing.

15. The suspension apparatus according to claim 14, wherein the spring bearing comprises a regulation portion that regulates deformation of the sidewall portions of the elastic sheet.

16. The elastic sheet according to claim 1, wherein the inclined surface extends from one end of the opening side of the wire contact surface toward a portion of the spring bearing.

17. The elastic sheet according to claim 1, wherein the wire contact surface is configured to contact the wire in such a manner that no gap is formed between the wire contact surface and the wire.

18. An elastic sheet interposed between a coil spring that is provided in a suspension apparatus and that extends in an axial direction and a spring bearing that supports a lower end portion of the coil spring,
the elastic sheet comprising:
a seating portion at which the coil spring is seated and which has a circular arc shape in a view from the axial direction, one circumferential side of the seating portion being a side of entry of the coil spring; and
a pair of sidewall portions extending from respective width-wise opposite ends of the seating portion toward the coil spring side, wherein
at least one of the sidewall portions has a wire contact surface that contacts a wire forming the coil spring and an inclined surface that is inclined so as to approach the spring bearing as the inclined surface extends width-wise outward from the wire contact surface,
a radius of the wire contact surface at least at an opening side is smaller than a radius of the wire, and
a horizontal plane normal to the axial direction passes through one end of the inclined surface and lies below the seating portion in the axial direction.

* * * * *